United States Patent
Kimura et al.

(10) Patent No.: US 9,894,657 B2
(45) Date of Patent: *Feb. 13, 2018

(54) COMMUNICATION CONTROL DEVICE, COMMUNICATION CONTROL METHOD, COMMUNICATION DEVICE, COMMUNICATION METHOD, AND COMMUNICATION SYSTEM

(71) Applicant: Sony Corporation, Tokyo (JP)

(72) Inventors: Ryota Kimura, Tokyo (JP); Ryo Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/458,056

(22) Filed: Mar. 14, 2017

(65) Prior Publication Data

US 2017/0188365 A1   Jun. 29, 2017

Related U.S. Application Data

(63) Continuation of application No. 15/157,137, filed on May 17, 2016, now Pat. No. 9,622,191, which is a
(Continued)

(30) Foreign Application Priority Data

Oct. 29, 2010 (JP) ................................. 2010-244295
Dec. 27, 2010 (JP) ................................. 2010-289183
Feb. 15, 2011 (JP) ................................. 2011-029992

(51) Int. Cl.
*H04B 7/00* (2006.01)
*H04W 72/04* (2009.01)
(Continued)

(52) U.S. Cl.
CPC ....... *H04W 72/0453* (2013.01); *H04W 16/14* (2013.01); *H04W 52/243* (2013.01); *H04W 72/0473* (2013.01); *H04W 72/082* (2013.01)

(58) Field of Classification Search
CPC . H04W 52/243; H04W 16/14; H04W 52/244; H04W 52/367; H04W 72/0453; H04W 72/0473; H04W 72/082
(Continued)

(56) References Cited

U.S. PATENT DOCUMENTS 5,970,412 A   10/1999   Maxemchuk
8,249,631 B2   8/2012   Sawai
(Continued)

FOREIGN PATENT DOCUMENTS

JP   2007-214819   8/2007
JP   2009-100452   5/2009
(Continued)

OTHER PUBLICATIONS

Cewit, Cognitive Interference Management for Type I Relays, 3GPP TSG RAN WG1 #58, Shenzhen, China, Aug. 24-28, 2009.
(Continued)

*Primary Examiner* — Dominic Rego
(74) *Attorney, Agent, or Firm* — Wolf, Greenfield & Sacks, P.C.

(57) ABSTRACT

Provided is a communication control device including a communication unit configured to make communication with one or more secondary communication nodes operating a secondary system using at least one of a frequency channel allocated to a primary system and a frequency channel adjacent to the frequency channel, a determination unit configured to determine an upper limit number of secondary systems or secondary communication nodes to be allocated with transmission power, and a power allocation unit con-
(Continued)

figured to allocate transmission power to each secondary system or each secondary communication node in each secondary system based on the determined upper limit number and the acceptable interference amount of the primary system.

20 Claims, 22 Drawing Sheets

Related U.S. Application Data continuation of application No. 13/880,963, filed as application No. PCT/JP2011/071250 on Sep. 16, 2011, now Pat. No. 9,363,767.

(51) Int. Cl.
H04W 52/24 (2009.01)
H04W 72/08 (2009.01)
H04W 16/14 (2009.01)

(58) Field of Classification Search
USPC ... 455/522, 68–70, 115.3, 127.1, 135, 226.3, 455/277.2, 296, 552.1; 370/318
See application file for complete search history.

(56) References Cited

U.S. PATENT DOCUMENTS

| | | |
|---|---|---|
| 8,265,684 B2 | 9/2012 | Sawai |
| 8,577,406 B2 | 11/2013 | Sawai et al. |
| 8,588,829 B2 | 11/2013 | Sawai |
| 8,639,281 B2 | 1/2014 | Sawai et al. |
| 9,078,243 B2 | 7/2015 | Sawai |
| 9,131,387 B2 | 9/2015 | Sawai et al. |
| 9,137,761 B2 | 9/2015 | Sawai |
| 9,215,670 B2 | 12/2015 | Sawai et al. |
| 9,363,767 B2 | 6/2016 | Kimura et al. |
| 9,380,575 B2 | 6/2016 | Sawai |
| 9,510,302 B2 | 11/2016 | Sawai et al. |
| 9,622,191 B2 | 4/2017 | Kimura et al. |
| 9,661,587 B2 | 5/2017 | Sawai |
| 2005/0130692 A1 | 6/2005 | Furukawa et al. |
| 2005/0202839 A1 | 9/2005 | Merboth et al. |
| 2006/0286934 A1 | 12/2006 | Kuffner et al. |
| 2007/0183392 A1 | 8/2007 | Tandai et al. |
| 2007/0287465 A1 | 12/2007 | Hyon et al. |
| 2008/0095133 A1 | 4/2008 | Kodo et al. |
| 2008/0279125 A1 | 11/2008 | Hottinen |
| 2009/0011788 A1 | 1/2009 | Shan et al. |
| 2010/0061351 A1 | 3/2010 | Lee et al. |
| 2010/0067428 A1 | 3/2010 | Cordeiro et al. |
| 2010/0081449 A1 | 4/2010 | Chaudhri et al. |
| 2010/0331026 A1 | 12/2010 | Hottinen et al. |
| 2011/0028170 A1 | 2/2011 | Sawai |
| 2011/0028179 A1 | 2/2011 | Sawai et al. |
| 2011/0028180 A1 | 2/2011 | Sawai |
| 2011/0034204 A1 | 2/2011 | Sawai et al. |
| 2012/0309439 A1 | 12/2012 | Sawai |
| 2013/0100893 A1 | 4/2013 | Sawai |
| 2013/0102344 A1 | 4/2013 | Sawai |
| 2013/0102350 A1 | 4/2013 | Sawai et al. |
| 2013/0217429 A1 | 8/2013 | Kimura et al. |
| 2013/0316756 A1 | 11/2013 | Sawai et al. |
| 2014/0045542 A1 | 2/2014 | Sawai |
| 2015/0230243 A1 | 8/2015 | Sawai |
| 2015/0334664 A1 | 11/2015 | Sawai et al. |
| 2015/0351045 A1 | 12/2015 | Sawai |
| 2016/0073356 A1 | 3/2016 | Sawai et al. |
| 2016/0278157 A1 | 9/2016 | Sawai |
| 2016/0337983 A1 | 11/2016 | Kimura et al. |
| 2016/0366653 A1 | 12/2016 | Sawai et al. |
| 2017/0086145 A1 | 3/2017 | Sawai |

FOREIGN PATENT DOCUMENTS

| | | |
|---|---|---|
| JP | 2010-206780 | 9/2010 |
| WO | WO 2010/035842 A1 | 4/2010 |

OTHER PUBLICATIONS

Chairman Martin and Commissioner Copps, Adelstein, and McDowell, SE43-Cognitivie Radio Systems—White Spaces (470-790MHz) J, FCC Second Report and Order and Memorandum Opinion and Order Release: Nov. 14, 2008, pp. 1-130, Washington, DC 20554.

Inage et al, Spectrum Sharing Based on Capacity Conservation Ration of Primary User, The Institue of Electronics, Information and Communication Engineers (IEICE), vol. 109, No. 61, May 21, 2009, pp. 1-23, Kanagawa, Japan.

Second Report and Order Memorandum Opinion and Order, OSE43-Cognitive Radio Systems—White Spaces (470-790MHz) J, Oct. 29, 2010, pp. 1-130, Washington DC 20554.

Standard ECMA-392 MAC and PHY for operation in TV White Space, Oct. 29, 2010, pp. 1-182, Geneva Switzerland.

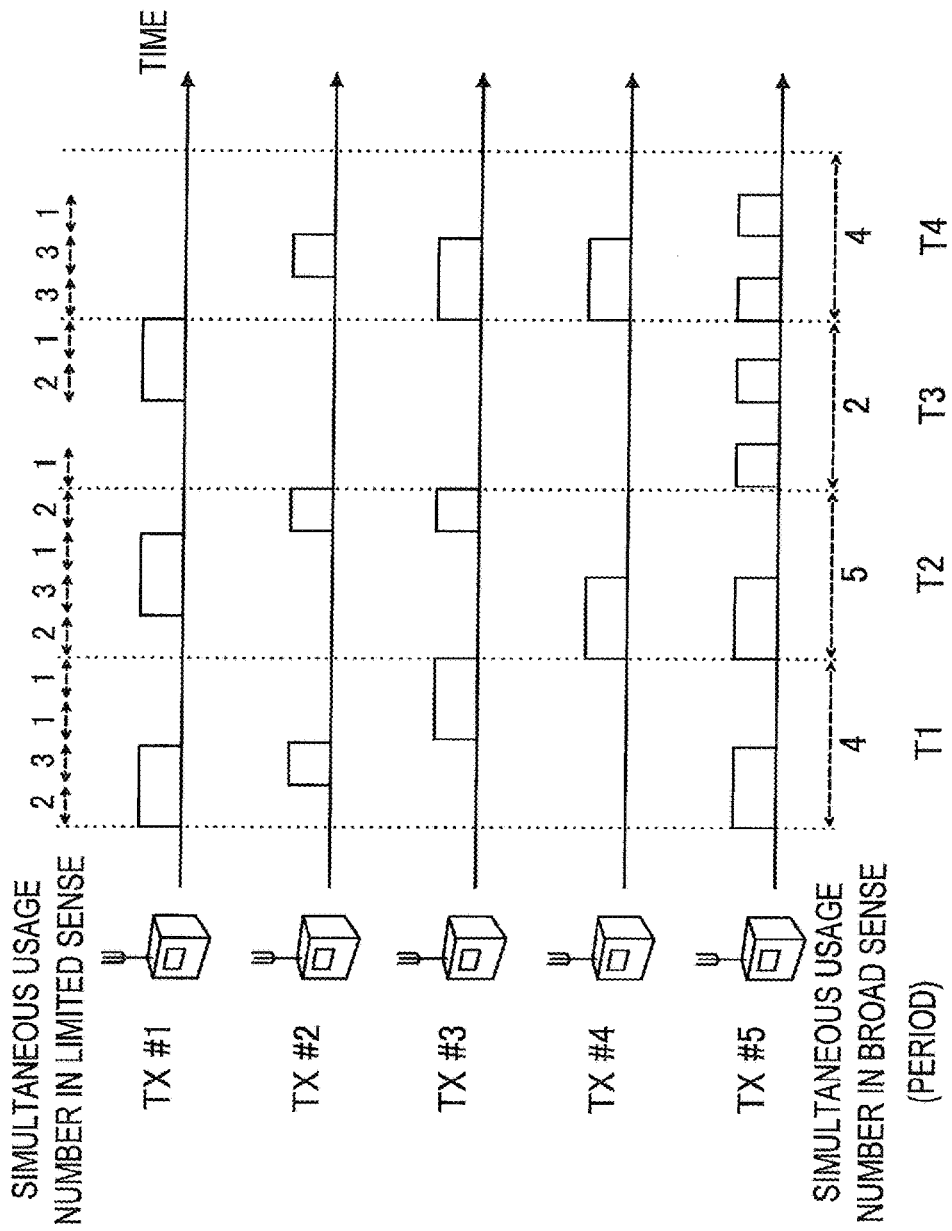

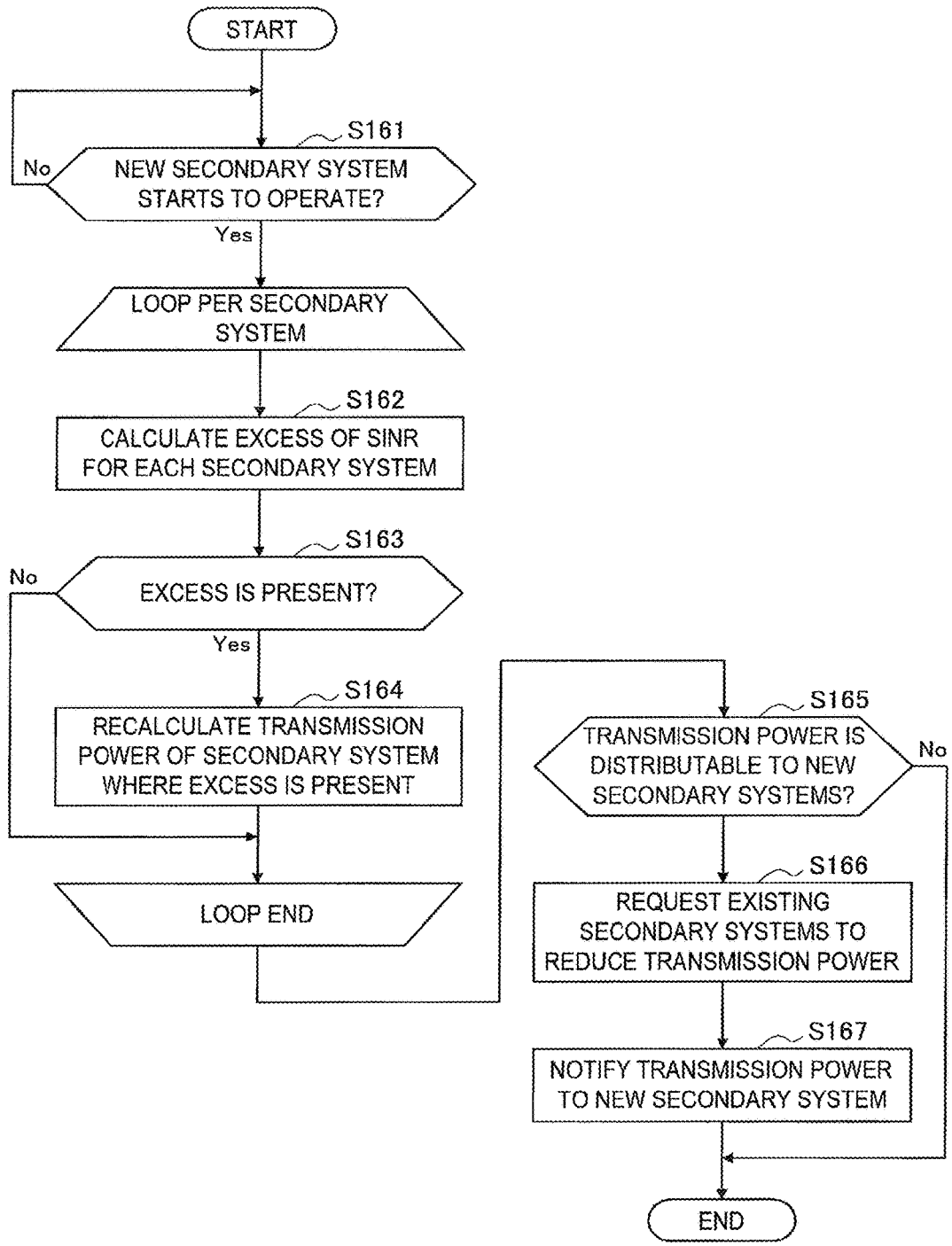

FIG.12

| CHANNEL NUMBER | SECONDARY SYSTEM ID | REQUIRED QUALITY | EXCESS RATE | TRANSMISSION POWER ALLOCATION |
|---|---|---|---|---|
| #1 | K01 | $SINR_{req}$ (K01) | 1.2 | P (f1,K01) |
| | K02 | $SINR_{req}$ (K02) | 1.0 | P (f1,K02) |
| | .. | .. | .. | .. |
| #2 | K01 | $SINR_{req}$ (K01) | 1.4 | P (f1,K02) |
| | .. | .. | .. | .. |
| .. | | | | |

SECONDARY SYSTEM MANAGEMENT TABLE

COMMUNICATION CONTROL DEVICE, COMMUNICATION CONTROL METHOD, COMMUNICATION DEVICE, COMMUNICATION METHOD, AND COMMUNICATION SYSTEM

CROSS REFERENCE TO RELATED APPLICATIONS

This is a continuation of and claims the benefit under 35 U.S.C. § 120 of U.S. patent application Ser. No. 15/157,137, titled "COMMUNICATION CONTROL DEVICE, COMMUNICATION CONTROL METHOD, COMMUNICATION DEVICE, COMMUNICATION METHOD, AND COMMUNICATION SYSTEM," filed on May 17, 2016, which is a continuation of and claims the benefit under 35 U.S.C. § 120 of U.S. patent application Ser. No. 13/880,963, titled "COMMUNICATION CONTROL DEVICE, COMMUNICATION CONTROL METHOD, COMMUNICATION DEVICE, COMMUNICATION METHOD, AND COMMUNICATION SYSTEM," filed on Apr. 22, 2013, which is a U.S. National Stage Application under 35 U.S.C. § 371 of International Application No. PCT/JP2011/071250, filed on Sep. 16, 2011, which claims priority to Japanese Patent Application JP 2011-029992 filed on Feb. 15, 2011, Japanese Patent Application JP 2010-289183 filed on Dec. 27, 2010, and Japanese Patent Application JP 2010-244295 filed on Oct. 29, 2010, each of which is hereby incorporated by reference in its entirety.

TECHNICAL FIELD

The present disclosure relates to a communication control device, a communication control method, a communication device, a communication method, and a communication system.

BACKGROUND ART

Secondary usage of a frequency is discussed as a method for alleviating future depletion of frequency resources. The secondary usage of a frequency is that part of or all the frequency channels preferentially allocated to a system is secondarily used by the other system. Typically, a system which is preferentially allocated with a frequency channel is called primary system and a system which secondarily uses the frequency channel is called secondary system.

A TV white space is an exemplary frequency channel whose secondary usage is discussed (see Non-Patent Literatures 1 and 2). The TV white space is a channel which is not used by a TV broadcast system depending on an area among frequency channels allocated to the TV broadcast system as a primary system. The TV white space is opened to a secondary system so that the frequency resource can be efficiently utilized. A standard for a physical layer (PHY) and a MAC layer for enabling the secondary usage of the TV white space can employ IEEE802.22, IEEE802.11af and ECMA (European Computer Manufacturer Association)-392 (CogNea, see Non-Patent Literature 3 described later).

The secondary system is generally required to operate so as not to give a fatal interference to the primary system during the secondary usage of the frequency band. An important technique therefor is transmission power control. For example, Patent Literature 1 described later proposes therein a method for calculating a path loss from a base station as a secondary system to a reception device as a primary system and a discrete frequency width between frequency channels and determining maximum transmission power of the secondary system based on the calculation result.

CITATION LIST

Non-Patent Literature

Non-Patent Literature 1: "SECOND REPORT AND ORDER AND MEMORANDUM OPINION AND ORDER", [online], [searched on Oct. 12, 2010], Internet<URL:http://hraunfoss.fcc.gov/edocs_public/attachmatch/FCC-08-260A1.pdf>

Non-Patent Literature 2: "SE43-Cognitive radio systems-White spaces (470-790 MHz)", [online], [searched on Oct. 12, 2010], Internet<URL:http://www.cept.org/0B322E6B-375D-4B8F-868B-3F9E5153CF72.W5Doc?frames=no&>

Non-Patent Literature 3: "Standard ECMA-392 MAC and PHY for Operation in TV White Space", [online], [searched on Oct. 12, 2010], Internet<URL:http://www.ecma-international.org/publications/standards/Ecma-392.htm>

Patent Literature

Patent Literature 1: JP 2009-100452 A

SUMMARY OF INVENTION

Technical Problem

However, with the method described in Patent Literature 1 described above, the base station in a secondary system does not take into account the possibility of the presence of the other secondary system, and thus the acceptable interference amount to the primary system can be exceeded when a plurality of secondary systems are present.

It is therefore desirable to provide a mechanism capable of preventing fatal interferences to the primary system upon secondary usage of a frequency band even when a plurality of secondary systems are present.

Solution to Problem

According to an embodiment, there is provided a communication control device including a communication unit configured to make communication with one or more secondary communication nodes operating a secondary system using at least one of a frequency channel allocated to a primary system and a frequency channel adjacent to the frequency channel, a determination unit configured to determine an upper limit number of secondary systems or secondary communication nodes to be allocated with transmission power, and a power allocation unit configured to allocate transmission power to each secondary system or each secondary communication node in each secondary system based on the determined upper limit number and the acceptable interference amount of the primary system.

Further, the determination unit may determine the upper limit number based on a communication quality requirement of each secondary system.

Further, the determination unit may determine the upper limit number by evaluating a difference between the interference amount to the primary system estimated by a communication quality requirement of each secondary system and the acceptable interference amount of the primary system.

Further, when a plurality of frequency channels are used by one or more secondary systems, the power allocation unit may allocate transmission power to each secondary system or each secondary communication node in each secondary system such that a sum of the interference amounts to the primary system caused by secondary usage of the frequency channels does not exceed the acceptable interference amount.

Further, the determination unit may determine a first upper limit number of frequency channels allocated to the primary system and a second upper limit number of other frequency channels, and the power allocation unit uses the first upper limit number and the second upper limit number to allocate transmission power to each secondary system or each secondary communication node in each secondary system.

Further, the power allocation unit may tentatively distribute transmission power to secondary systems using a frequency channel per frequency channel used by the secondary system, and then redistributes transmission power in secondary systems using a different frequency channel based on the tentatively-distributed transmission power.

The power allocation unit may distribute or redistributes transmission power in secondary systems, and then corrects transmission power to be allocated to each secondary system based on a comparison between the acceptable interference amount and the interference amount at a point where a sum of the interference amounts is the largest within a service area of a primary system.

Further, the communication unit may receive priority information for defining a priority of a secondary system from another device, and the power allocation unit allocates transmission power based on the transmission power tentatively distributed to a secondary system having a higher priority, and then redistributes transmission power to the remaining secondary systems.

Further, the communication unit may receive priority information for defining a priority of a secondary system from another device, and the power allocation unit uses a weight depending on the priority to weight transmission power to be allocated to each secondary system or each secondary communication node in each secondary system.

When a new secondary system starts to operate, the power allocation unit may request a secondary system having excess transmission power among existing secondary systems to reduce transmission power.

The determination unit may determine a position of a reference point of the primary system when estimating the interference amount to the primary system by use of information received from a data server in the primary system.

Further, the power allocation unit may determine transmission power allocation based on the acceptable interference amount of the primary system, and a path loss depending on a distance between the primary system and each secondary system, and the distance between the primary system and each secondary system is a minimum distance between the position of each secondary system and an outer periphery of a service area of the primary system or a node of the primary system.

Further, the power allocation unit may determine transmission power allocation based on the acceptable interference amount of the primary system, and a path loss depending on a distance between the primary system and each secondary system, and the distance between the primary system and each secondary system is a distance between the position of each secondary system and a certain point on an outer periphery of a service area of the primary system or within the outer periphery.

Further, the power allocation unit may ignore a secondary system for which a distance from the primary system or a path loss depending on the distance exceeds a predetermined threshold when calculating transmission power allocation.

Further, the threshold may be set per frequency channel.

Further, the power allocation unit may notify a power allocation result to a secondary communication node in response to a request from the secondary communication node received by the communication unit.

Further, the power allocation unit may notify a power allocation result to a secondary communication node without depending on a request from the secondary communication node.

Further, the power allocation unit may employ a margin for reducing an interference risk upon transmission power allocation, and the communication control device further comprises a margin setting unit configured to set the margin based on the number of secondary systems or secondary communication nodes in operation or the maximum number of operable secondary systems or secondary communication nodes per frequency channel.

Further, the margin setting unit may set a margin per frequency channel such that the margin of a frequency channel at the center of a band is relatively larger than the margins of frequency channels at the ends.

Further, according to another embodiment, there is provided a communication control method using a communication control device for making communication with one or more secondary communication nodes operating a secondary system by use of at least one of a frequency channel allocated to a primary system and a frequency channel adjacent to the frequency channel, including determining an upper limit number of secondary systems or secondary communication nodes to be allocated with transmission power, and allocating transmission power to each secondary system or each secondary communication node in each secondary system based on the determined upper limit number and the acceptable interference amount of the primary system.

Further, according to another embodiment, there is provided a communication device operating a secondary system by use of at least one of a frequency channel allocated to a primary system or a frequency channel adjacent to the frequency channel, including a communication unit configured to receive a transmission power allocation result from a communication control device configured to allocate transmission power to each secondary system or each secondary communication node in each secondary system based on an upper limit number of secondary systems or secondary communication nodes to be allocated with transmission power and the acceptable interference amount of the primary system, and a control unit configured to restrict transmission power for communication with another secondary communication node based on the transmission power allocation result received by the communication unit.

Further, according to another embodiment, there is provided a communication method by a communication device operating a secondary system by use of at least one of a frequency channel allocated to a primary system and a frequency channel adjacent to the frequency channel, including receiving a transmission power allocation result from a communication control device configured to allocate transmission power to each secondary system or each secondary communication node in each secondary system based on an upper limit number of secondary systems or secondary communication nodes to be allocated with transmission power, and the acceptable interference amount of the primary system, and restricting transmission power for communication with another secondary communication node based on the transmission power allocation result.

Further, according to another embodiment, there is provided a communication system including one or more secondary communication nodes operating a secondary system by use of at least one of a frequency channel allocated to a primary system and a frequency channel adjacent to the frequency channel, and a communication control device configured to control communication with the one or more secondary communication nodes. The communication control device includes a communication unit configured to communicate with the one or more secondary communication nodes, a determination unit configured to determine an upper limit number of secondary systems or secondary communication nodes to be allocated with transmission power, and a power allocation unit configured to allocate transmission power to each secondary system or each secondary communication node in each secondary system based on the determined upper limit number and the acceptable interference amount of the primary system. Each of the one or more secondary communication nodes includes a communication unit configured to receive a transmission power allocation result from the communication control device, and a control unit configured to restrict transmission power for communication with another secondary communication node based on the received transmission power allocation result.

Advantageous Effects of Invention

As described above, with the communication control device, the communication control method, the communication device, the communication method and the communication system according to the present disclosure, it is possible to prevent fatal interferences to a primary system upon secondary usage of a frequency band even when a plurality of secondary systems are present.

BRIEF DESCRIPTION OF DRAWINGS

FIG. 8 is an explanatory diagram for explaining a simultaneous usage number in a limited sense and a simultaneous usage number in a broad sense by way of example.

FIG. 11 is a flowchart illustrating an exemplary flow of a power readjustment processing according to one embodiment.

FIG. 12 is an explanatory diagram illustrating an exemplary structure of a secondary system management table according to one embodiment.

DESCRIPTION OF EMBODIMENT

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Hereinafter, "Description of Embodiment" will be described in the following order.

1. Outline of system
2. Basic interference control model

3. Exemplary structure of communication control device (manager)
4. Exemplary structure of communication device (secondary communication node)
5. Adaptive setting of margins
6. Conclusion <1. Outline of System>

Problems and an outline of a communication system according to one embodiment will be first described with reference to FIGS. 1 to 4.

[1-1. Problems Associated with Embodiment]

Figure 1:
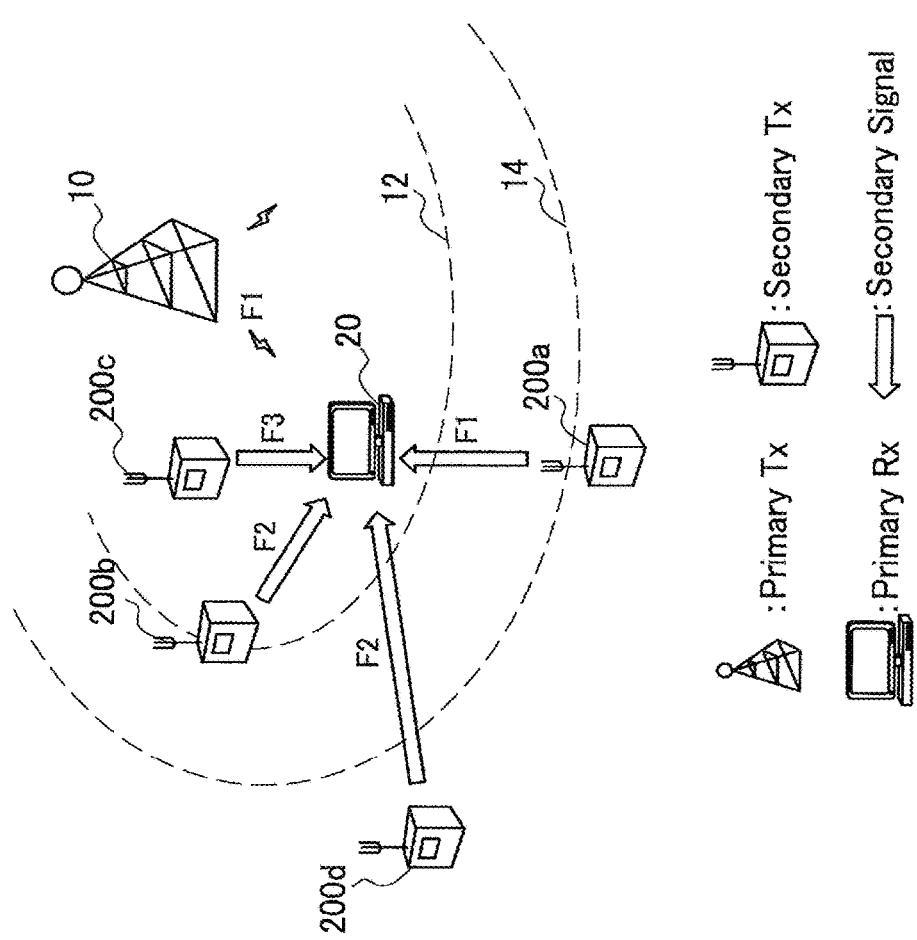
FIG. 1 is an explanatory diagram for explaining interferences caused in nodes of a primary system upon secondary usage of a frequency.

FIG. 1 is an explanatory diagram for explaining interferences caused in nodes of a primary system upon secondary usage of a frequency. With reference to FIG. 1, there are illustrated a primary transmission station 10 for providing services of the primary system, and a primary reception station 20 positioned within a boundary 12 of a service area of the primary system. The primary transmission station 10 may be a TV broadcast station, or a wireless base station or relay station in a cellular communication system, for example. When the primary transmission station 10 is a TV broadcast station, the primary reception station 20 is a receiver having an antenna or tuner for receiving TV broadcast. When the primary transmission station 10 is a wireless base station in a cellular communication system, the primary reception station 20 is a wireless terminal operating in the cellular communication system. In the example of FIG. 1, a channel F1 is allocated to the primary transmission station 10. The primary transmission station 10 can provide TV broadcast services, wireless communication services or some other wireless services (which will be referred to as primary service below) by transmitting wireless signals on the channel F1.

FIG. 1 illustrates communication nodes 200a, 200b, 200c and 200d of a plurality of secondary systems (which will be referred to as secondary communication node below). Each secondary communication node uses the channel F1 allocated to the primary system or a near channel F2 or F3 to operate the secondary system. In the example of FIG. 1, the secondary communication node 200a positioned outside a guard area between the boundary 12 and a boundary 14 uses the channel F1. The secondary communication nodes 200b and 200c positioned within the guard area use the channels F2 and F3 near the channel F1, respectively. The secondary communication node 200d positioned outside the guard area uses the channel F2.

Figure 2:
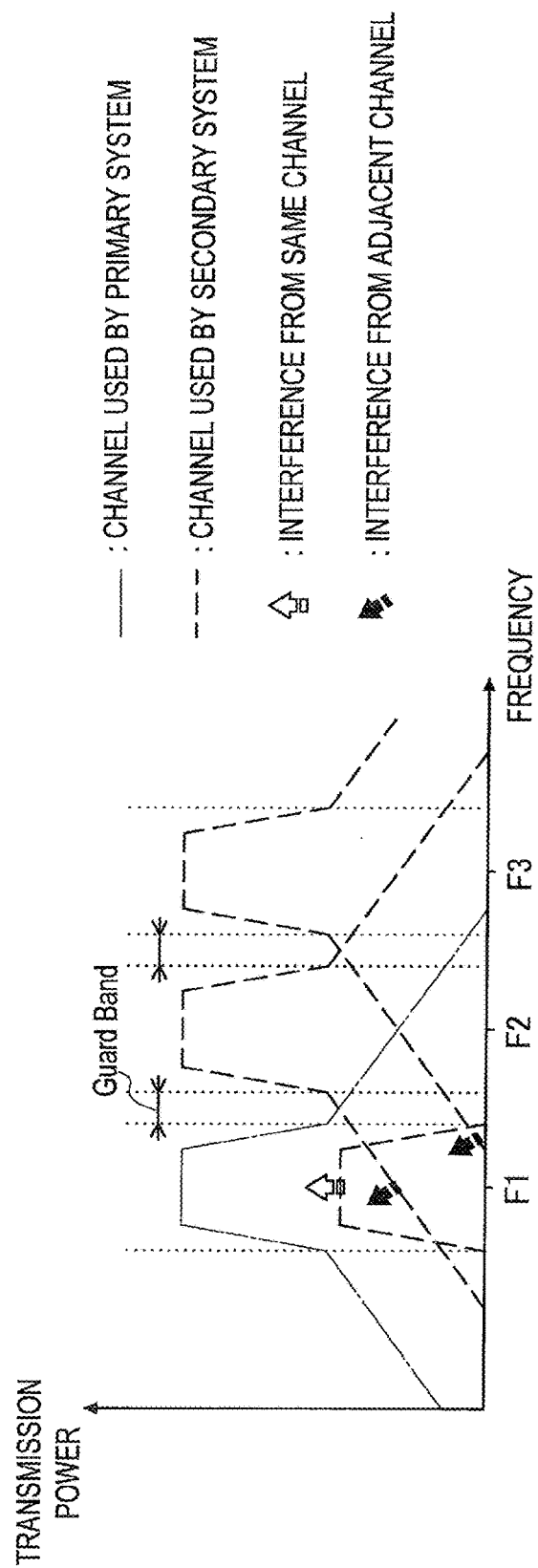
FIG. 2 is an explanatory diagram for explaining an in-band interference and an inter-band interference.

Under the circumstances of FIG. 1, the primary reception station 20 may be influenced by an interference caused by a wireless signal transmitted from each secondary communication node when receiving a primary service. FIG. 2 is an explanatory diagram for explaining an in-band interference and an inter-band interference. In the example of FIG. 2, the channel F1 is used by the primary system. When the channel F1 is secondarily used by the secondary communication node 200a of FIG. 1, an interference can occur in the same channel. The channel F2 is adjacent to the channel F1. The channel F3 is adjacent to the channel F2. A guard band is provided between the channel F1 and the channel F2 and between the channel F2 and the channel F3, respectively. It is ideal that when the channels F2 and F3 are used by other systems, the primary system is not interfered. However, as illustrated in FIG. 2, a considerable interference can actually occur in a near channel (such as channels F2, F3 and other channels) due to out-band radiation.

With an existing method, each secondary communication node illustrated in FIG. 1 controls its transmission power thereby to restrict an interference to be given to the primary system in a one-to-one relationship with the primary system. However, when a plurality of secondary systems are operated by a plurality of secondary communication nodes, interferences caused by the individual secondary systems are accumulated, consequently causing a risk that the primary system is subjected to a fatal interference. The existing method cannot sufficiently restrict such a risk thereby to secure a safe operation of the primary system.

[1-2. Outline of Communication System]

Figure 3:
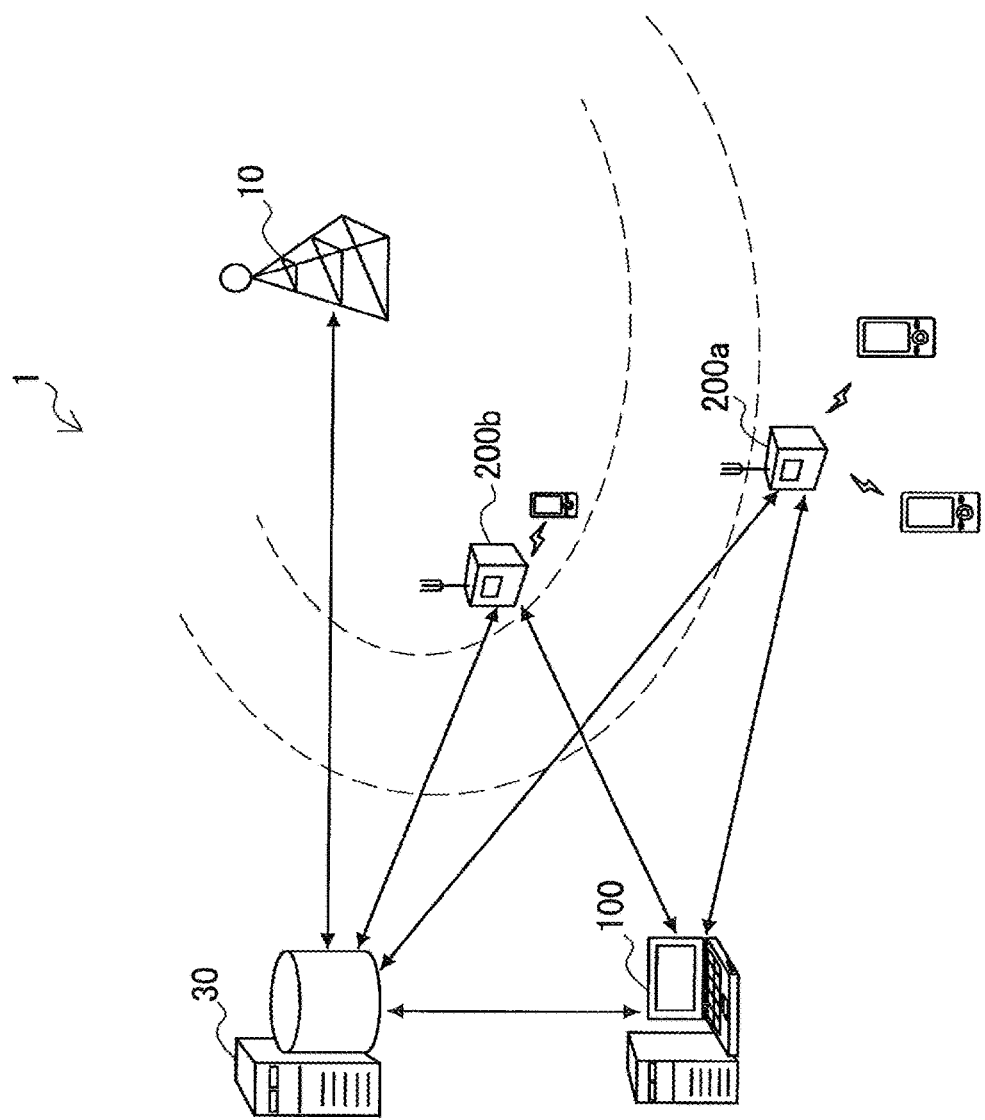
FIG. 3 is an explanatory diagram for explaining a structure of a communication system according to one embodiment.

FIG. 3 is an explanatory diagram for explaining a structure of a communication system 1 according to one embodiment. With reference to FIG. 3, the communication system 1 includes the primary transmission station 10, a data server 30, a communication control device 100 and the secondary communication nodes 200a and 200b. In the example of FIG. 3, only the secondary communication nodes 200a and 200b are illustrated as the secondary communication nodes, but more secondary communication nodes may be actually present. In the following explanation of the present specification, when the secondary communication nodes 200a and 200b (as well as other communication nodes) do not need to be particularly discriminated from each other, an alphabet subsequent to the numeral is omitted and they are collectively referred to as secondary communication node 200.

The data server 30 is a server device having a database storing therein data on secondary usage. The data server 30 provides data indicating secondarily usable channels and position data on the transmission station 10 of the primary system to the secondary communication node 200 in response to an access from the secondary communication node 200. The secondary communication node 200 registers information on the secondary system in the data server 30 when starting secondary usage. Communication between the data server 30 and the secondary communication node 200 may be made via an arbitrary network such as Internet. Refer to Non-Patent Literature 1 describing secondary usage of TV white space for an exemplary specification of the data server.

The communication control device 100 serves as a secondary system manager for adjusting transmission power used by each secondary communication node 200 such that interferences due to the operation of the secondary systems do not cause a fatal impact on the primary system. The communication control device 100 is accessible to the data server 30 via a network such as Internet, and acquires data to be used for adjusting transmission power from the data server 30. The communication control device 100 is communicably connected to each secondary communication node 200. The communication control device 100 adjusts transmission power of the secondary systems in response to a request from the secondary communication node 200 or the primary system or periodically. The communication control device 100 may be mounted on physically the same device as the data server 30 or any secondary communication node 200, not limited to the example of FIG. 3.

Figure 4:
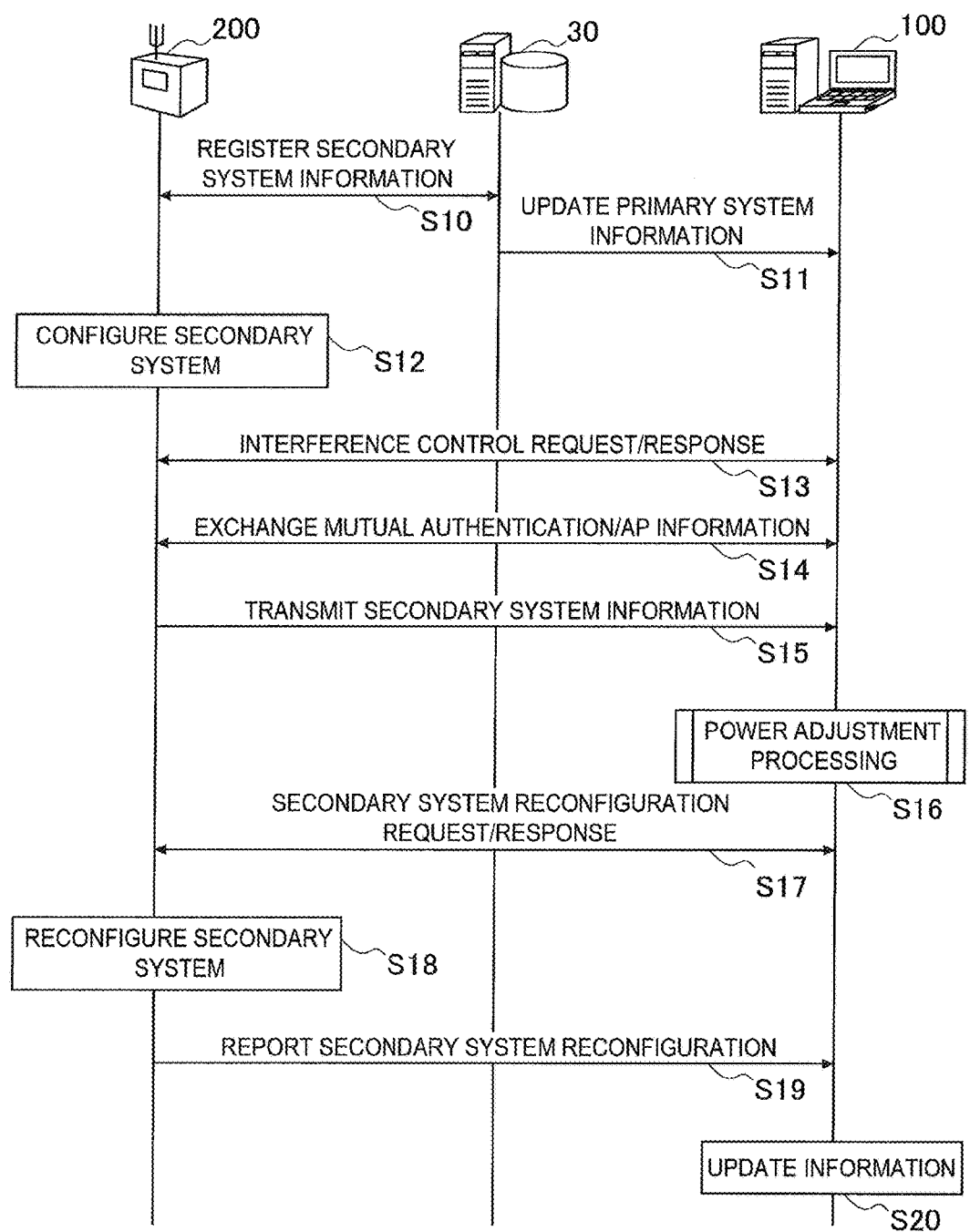
FIG. 4 is a sequence diagram illustrating an exemplary schematic flow of an interference control processing performed in the communication system according to one embodiment.

FIG. 4 is a sequence diagram illustrating an exemplary schematic flow of an interference control processing performed in the communication system 1.

At first, the secondary communication node 200 registers the information on the secondary system in the data server 30 when starting secondary usage (step S10). The information registered herein includes ID, class and positional data of a device starting secondary usage, for example. The data server 30 notifies, to the secondary communication node 200, information for configuring the secondary system such as channel number list of secondarily usable frequency channels, acceptable maximum transmission power and spectrum mask according to the registration of the information on the secondary system. A cycle of accesses to the data server 30 by the secondary communication node 200 may be determined based on a law regulating frequency usage. For example, for FCC (Federal Communications Commission), there is discussed a requirement that when a position of a secondary communication node changes, position data should be updated every at least 60 seconds. There is further recommended that a list of usable channel numbers should be confirmed by a secondary communication node every at least 30 seconds. However, an increase in accesses to the data server 30 causes an increase in overheads. Thus, a cycle of accesses to the data server 30 may be set to be longer (such as integral multiple of a defined cycle). The access cycle may be dynamically set depending on the number of active nodes (the cycle may be set to be longer because of a low risk of interference when the number of nodes is low, for example). The access cycle may be instructed to the secondary communication node 200 by the data server 30 upon initial registration of the information on the secondary system, for example.

The communication control device 100, for example, periodically receives information on the primary system from the data server 30, and updates the information stored therein by use of the received information (step S11). The received information may include one or more among position data of the transmission station 10 as a primary system, height of antenna, width of guard area, list of channel numbers of frequency channels, acceptable interference amount of the primary system, position data on reference point for interference calculation described later, list of IDs of registered secondary communication nodes 200, and other parameters (such as adjacent channel leakage ratio (ACLR), fading margin, shadowing margin, protection ratio and adjacent channel selection (ACS)). The communication control device 100 may receive all or part of the information on the primary system (such as list of channel numbers) indirectly from the secondary communication node 200. As described later, when a distribution margin is adaptively set for distributing transmission power, the communication control device 100 may receive the parameters to be used for setting a distribution margin from the data server 30. The parameters to be used for setting a distribution margin may include the number of active secondary systems or the number of secondary communication nodes per channel, or its representative value (such as inter-band maximum value).

Then, the secondary communication node 200 configures a secondary system based on the information notified from the data server 30 (step S12). For example, the secondary communication node 200 selects one or a plurality of channels from the secondarily usable frequency channels, and transmits a beacon to its surroundings on the selected channels. Then, the secondary communication node 200 establishes communication with a device responding to the beacon.

Thereafter, an interference control request is transmitted from the secondary communication node 200 to the communication control device 100 or from the communication control device 100 to the secondary communication node 200 (step S13). The interference control request may be transmitted from the secondary communication node 200 in response to a detected wireless signal from a different secondary system from the secondary system operated by the secondary communication node 200, for example. Instead, the interference control request may be actively transmitted from the communication control device 100 to each secondary communication node 200, for example. The interference control request may be transmitted before configuring the secondary system in step S12.

When a response is returned to the interference control request, mutual authentication and application level information are exchanged between the communication control device 100 and the secondary communication node 200 (step S14). The information on the secondary system is transmitted from the secondary communication node 200 to the communication control device 100 (step S15). The information transmitted herein may include ID, class and position data of the secondary communication node 200, channel number of frequency channel (used channel) selected by the secondary communication node 200, information on communication quality requirements (Quality of Service (QoS)), priority information and communication history.

Then, the communication control device 100 performs a power adjustment processing based on the information acquired from the data server 30 and the secondary communication node 200 (step S16). The power adjustment processing by the communication control device 100 will be described below in detail. Then, the communication control device 100 notifies a power allocation result to the secondary communication node 200, and requests to reconfigure the secondary system (step S17).

Then, the secondary communication node 200 reconfigures the secondary system based on the power allocation result notified from the communication control device 100 (step S18). Then, when finishing reconfiguring the secondary system, the secondary communication node 200 reports a reconfiguration result to the communication control device 100 (step S19). Then, the communication control device 100 updates the information on the secondary system stored therein in response to the report from the secondary communication node 200 (step S20).

<2. Basic Interference Control Model>

The power adjustment processing by the communication control device 100 in step S16 in the above sequence may be a processing based on an interference control model described later, for example. The mathematical formulas for the interference control model will be described herein by use of a true value expression, but the interference control model can cope with a decibel value expression by conversion of the mathematical formulas.

At first, a reference point for interference calculation is assumed as i, a frequency channel allocated to the primary system is assumed as $f_j$, and the acceptable interference amount of the primary system is assumed as $I_{acceptable}(i, f_j)$. A single secondary system k secondarily using the channel $f_j$ is assumed to be positioned on the outer periphery of the guard area. Then, the following relational formula is established for maximum transmission power $P_{max}(f_j, k)$ of the secondary system, a path loss $L(i, f_j, k)$ for a minimum discrete distance (guard area width), and the acceptable interference amount $I_{acceptable}(i, f_j)$.

[Math. 1]

$$I_{acceptable}(i,f_j) = P_{max}(f_j,k) \cdot L(i,f_j,k) \qquad (1)$$

The position of the reference point may be determined based on the information received from the data server 30 by the communication control device 100 in step S11 in FIG. 4. When the reference point is previously defined, the position data indicating the position of the reference point (such as latitude and longitude) may be received from the data server 30. The communication control device 100 may dynamically determine the position of the reference point by use of the position data of the nodes, the service area or the guard area of the primary system received from the data server 30, and the position data received from each secondary communication node 200.

When a plurality of secondary systems are present, transmission power allocation to each secondary system is required to meet the following relational formula obtained by extending formula (1).

[Math. 2]

$$I_{acceptable}(i, f_j) \geq \sum_{k=1}^{M_j} P(f_j, k) \cdot L(i, f_j, k) \cdot G(f_j, k) + \sum_{jj=1}^{O_j} \sum_{kk=1}^{N_{jj}} \{P(f_{jj}, kk) \cdot L(i, f_{jj}, kk) \cdot G(f_{jj}, kk)/H(f_j, f_{jj}, kk)\} \quad (2)$$

Herein, the first term in the right side in formula (2) indicates a sum of the interference amounts caused by the secondary systems secondarily using the same channel as the channel $f_j$ allocated to the primary system. $M_j$ is the number of secondary systems secondarily using the same channel, $P(f_j, k)$ is power allocated to the k-th secondary system (or a master secondary communication node for managing the secondary systems or all the secondary communication nodes including the master and the slaves), $L(i, f_j, k)$ is a path loss between the k-th secondary system and the reference point i of the primary system, and $G(f_j, k)$ is a gain component. The second term indicates a sum of the interference amounts caused by the secondary systems secondarily using a near channel different from the channel $f_j$. $O_j$ is the number of near channels, jj is an index of a near channel, $N_{jj}$ is the number of secondary systems secondarily using a near channel, kk is an index of the secondary system secondarily using a near channel, and $H(f_j, f_{jj}, kk)$ is a loss component for the secondary system kk from the near channel $f_{jj}$ to the channel $f_j$. $M_j$ and $N_{jj}$ may be the number of active secondary systems (or secondary communication nodes).

The gain component G in formula (2) may be mainly determined based on the factors indicated in Table 1.

TABLE 1

Factors of gain component between systems

| Sign | Factor |
|---|---|
| PR $(f_{jj} - f_j)$ | Protection ratio between channels with frequency separated by $f_{jj} - f_j$ |
| μσ | Shadowing margin |
| σ | (Standard deviation of) shadowing |
| $D_{dir}$ (i, $f_{j\ (or\ jj)}$) | Signal identification degree by antenna directivity of primary reception station at channel $f_j(f_{jj})$ and reference point i |
| $D_{pol}$ (i, $f_{j\ (or\ jj)}$) | Signal identification degree by polarized wave of primary reception station at channel $f_j(f_{jj})$ and reference point i |
| $G_{ant}$ (i, $f_{j\ (or\ jj)}$) | Antenna gain of primary reception station at channel $f_j(f_{jj})$ and reference point i |
| $L_f$ (i, $f_{j\ (or\ jj)}$) | Feeder loss of primary reception station at channel $f_j(f_{jj})$ and reference point i |

For example, for the protection ratio PR in Table 1, the following concept may be applied. That is, the acceptable interference amount from the secondary system secondarily using a channel $f_{CR}$ to the primary system using a channel $f_{BS}$ is assumed as $I_{acceptable}$. Further, required reception power of the primary system is assumed as $P_{req}(f_{BS})$. The following formula is established between the parameters.

[Math. 3]

$$I_{acceptable} = P_{req}(f_{BS})/PR(f_{CR} - f_{BS}) \quad (3)$$

When the protection ratio is in a decibel expression, the following formula may be used instead of formula (3).

[Math. 4]

$$I_{acceptable} = P_{req}(f_{BS})/10^{PR(f_{CR} - f_{BS})/10} \quad (4)$$

The loss component H in formula (2) depends on selectivity and leakage ratio of a near channel, for example. Refer to "Technical and operational requirements for the possible operation of cognitive ratio systems in the "white spaces" of the frequency band 470-790 MHz" (ECC Report 159, 2010) for the details of the gain component and the loss component.

<3. Exemplary Structure of Communication Control Device (Manager)>

An exemplary structure of the communication control device 100 for adjusting transmission power between the secondary systems according to the interference control model will be described below.

[3-1. Entire Structure]

Figure 5:
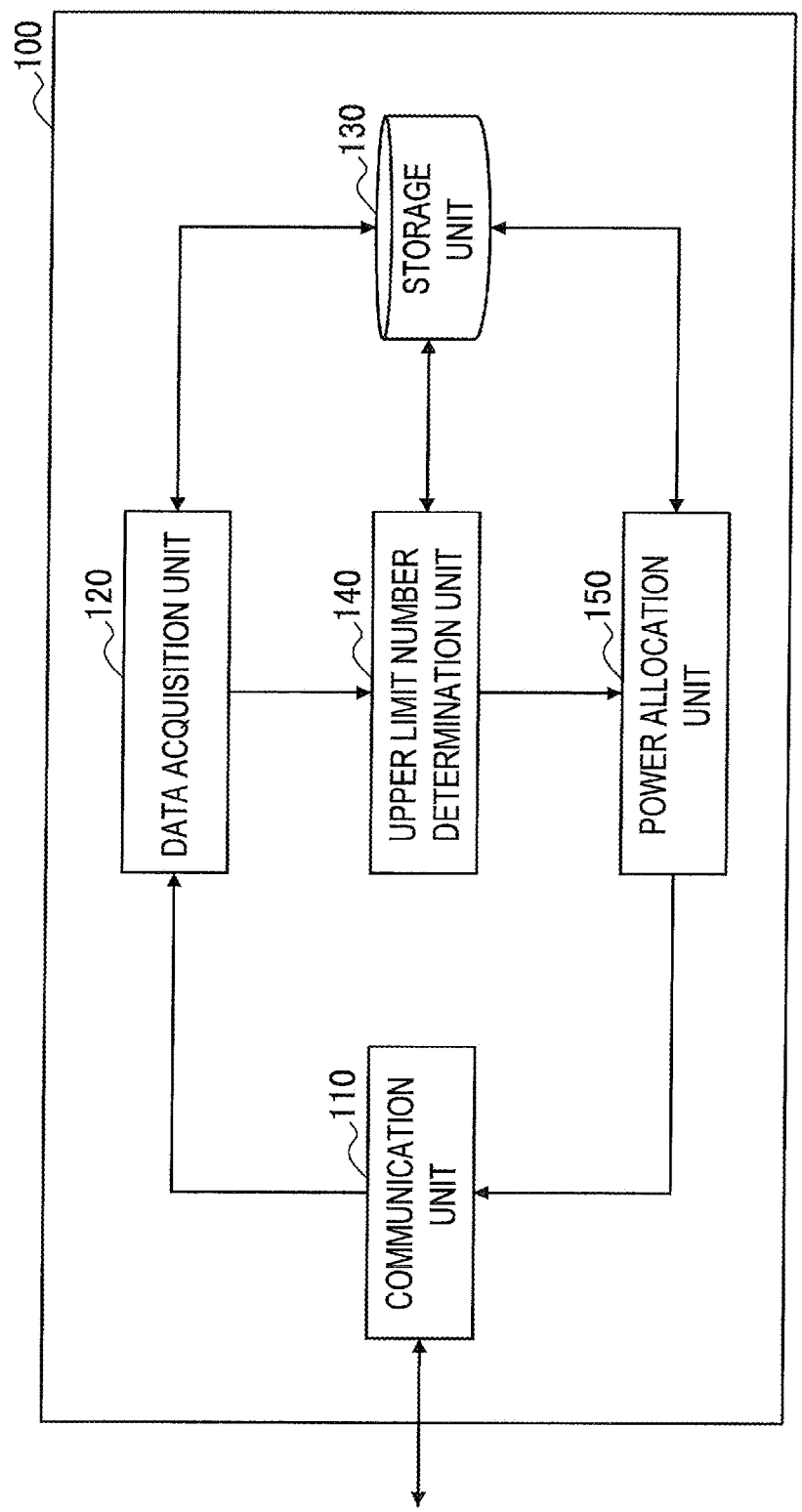
FIG. 5 is a block diagram illustrating an exemplary structure of a communication control device according to one embodiment.

FIG. 5 is a block diagram illustrating an exemplary structure of the communication control device 100 according to the present embodiment. With reference to FIG. 5, the communication control device 100 comprises a communication unit 110, a data acquisition unit 120, a storage unit 130, an upper limit number determination unit 140 and a power allocation unit 150.

The communication unit 110 operates as a communication interface for communication between the communication control device 100, and the data server 30 and the secondary communication node 200. The communication between the communication control device 100, and the data server 30 and the secondary communication node 200 may be realized by any of wired communication, wireless communication or a combination thereof, respectively.

The data acquisition unit 120 acquires various items of data to be used by the communication control device 100 for adjusting transmission power between the secondary systems from the data server 30 and the secondary communication node 200. For example, the data acquisition unit 120 receives the information on the primary system from the data server 30. For example, the data acquisition unit 120 may receive the information on the secondary system from the secondary communication node 200. Then, the data acquisition unit 120 stores the acquired data in the storage unit 130.

The storage unit 130 stores programs and data to be used for adjusting transmission power by use of a storage medium such as hard disk or semiconductor memory. For example, the storage unit 130 stores therein information previously defined by a protocol or regulation, as well as the information acquired by the data acquisition unit 120. The data stored in the storage unit 130 is output to each unit upon the processing by the upper limit number determination unit 140 and the power allocation unit 150. The storage unit 130 stores a power allocation result by the power allocation unit 150.

The upper limit number determination unit 140 determines an upper limit number of transmission power allocation targets. The number of transmission power allocation targets may be counted as the number of secondary systems or may be counted as the number of secondary communication nodes participating in the secondary systems. For example, when communication is multiplexed in a time division manner in the secondary system, one secondary communication node transmits a wireless signal within a secondary system at a timing. Thus, in this case, the number of secondary systems and the number of secondary communication nodes do not need to be discriminated. An upper limit number determined by the upper limit number determination unit 140 may be used as the numbers $M_j$ and $N_{jj}$ of secondary systems in the right side of formula (2) described above by the power allocation unit 150 described later.

In the present embodiment, the upper limit number determination unit 140 determines an upper limit number of transmission power allocation targets based on the communication quality requirement of each secondary system, for example. More specifically, for example, the upper limit number determination unit 140 estimates the interference amount to the primary system when transmission power meeting the communication quality requirement of each secondary system is allocated to the secondary system. Then, the upper limit number determination unit 140 evaluates a difference between the estimated interference amount and the acceptable interference amount of the primary system. Then, the upper limit number determination unit 140 determines the maximum number of secondary systems not exceeding the acceptable interference amount of the primary system as the upper limit number of transmission power allocation targets. An exemplary processing by the upper limit number determination unit 140 will be described below more specifically.

The power allocation unit 150 allocates transmission power to each secondary system or each secondary communication node in each secondary system based on the upper limit number determined by the upper limit number determination unit 140 and the acceptable interference amount of the primary system. At this time, when a plurality of frequency channels are used by one or more secondary systems, (in the situation of FIG. 1, for example), the power allocation unit 150 distributes transmission power between the secondary systems such that a sum of the interference amounts to the primary system caused by the use of the frequency channels does not exceed the acceptable interference amount of the primary system ($I_{acceptable}(i, f_j)$ in formula (1)). An exemplary processing of the power allocation unit 150 will be described below more specifically.

[3-2. Detailed Processing]

Figure 6:
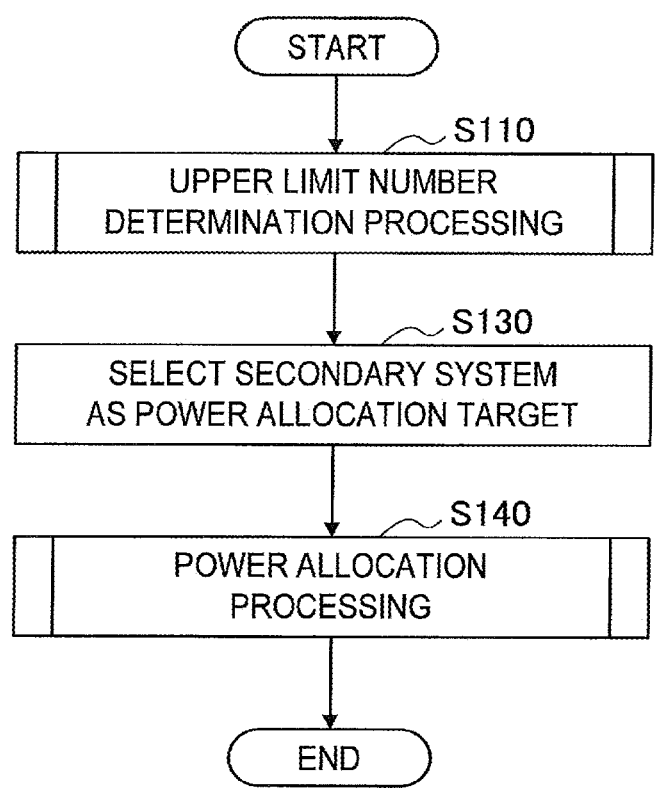
FIG. 6 is a flowchart illustrating an outline of a flow of a power adjustment processing by the communication control device according to one embodiment.

FIG. 6 is a flowchart illustrating an outline of a flow of a power adjustment processing in step S16 in FIG. 4. With reference to FIG. 6, a power adjustment processing by the communication control device 100 can be divided into three stages. The first stage is an upper limit number determination processing by the upper limit number determination unit 140 (step S110). The second stage is to select a secondary system as a power allocation target (step S130). The third stage is a power allocation processing by the power allocation unit 150 (step S140). Each of the three stages will be described below in detail.

(1) Upper Limit Number Determination Processing

Figure 7:
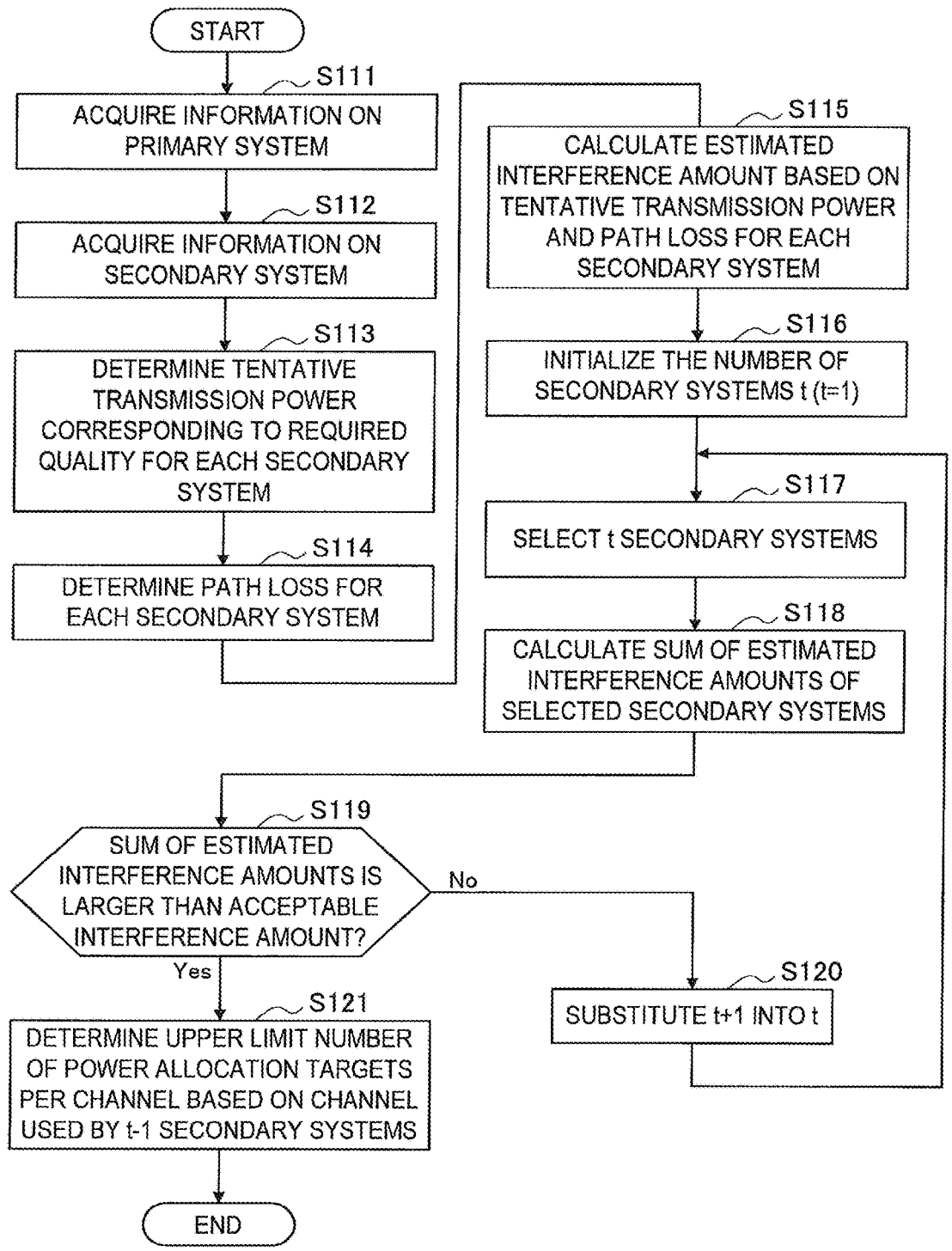
FIG. 7 is a flowchart illustrating an exemplary flow of an upper limit number determination processing according to one embodiment.

FIG. 7 is a flowchart illustrating an exemplary flow of the upper limit number determination processing by the upper limit number determination unit 140.

With reference to FIG. 7, the upper limit number determination unit 140 acquires the information on the primary system provided from the data server 30 from the storage unit 130 (step S111). The information acquired herein includes data on the acceptable interference amount of the primary system, and on the positions of the boundaries of the service area and the guard area of the primary system. The upper limit number determination unit 140 acquires the information on the secondary system collected from the secondary communication nodes 200 from the storage unit 130 (step S112). The information acquired herein includes information on communication quality requirements per secondary system and position data on the secondary communication nodes 200. The information on communication quality requirements may include minimum required signal-to-noise ratio (SNR), signal-to-interference and noise ratio (SINR), or requested transmission power, for example.

Then, the upper limit number determination unit 140 determines tentative transmission power corresponding to the required communication quality for each secondary system (step S113). The tentative transmission power corresponding to the required communication quality may be minimum transmission power required for meeting a required minimum SIR, for example. Instead, the tentative transmission power corresponding to the required communication quality may be requested transmission power. For example, in the FCC rule, maximum transmission power fixed per device authentication class is defined. The upper limit number determination unit 140 may determine maximum transmission power defined for an authentication class of the secondary communication node 200 as tentative transmission power instead of determining the tentative transmission power according to the required communication quality as in the example of FIG. 7.

Then, the upper limit number determination unit 140 determines a path loss depending on a position of the secondary communication node 200 for each secondary system (step S114). A method for calculating a path loss may be a method using a propagation curve described in the following literature 1 or literature 2, for example.

Literature 1: "BPR-10: Application Procedures and Rules for Digital Television (DTV) Undertakings" (Industry Canada, BPR-10, Issue 1, August 2010)

Literature 2: "Method for point-to-area predictions for terrestrial services in the frequency range 30 MHz to 3000 MHz" (Recommendation ITU-R P.1546-4, October 2009)

When a propagation curve is used, a reference table indicating the propagation curve is previously stored in the storage unit 130. Then, the upper limit number determination unit 140 determines a path loss corresponding to a distance between the secondary communication node 200 and the reference point of the primary system with reference to the propagation curve. The upper limit number determination unit 140 may determine a path loss depending on a distance between a position of the closest node to the reference point among the slave nodes of the secondary system operated by the secondary communication nodes 200 and the reference point, not depending on the position of the secondary communication node 200. For the calculation, only the slave nodes which are estimated to have a higher interference level than the secondary communication node 200 may be considered based on the parameters such as antenna height or antenna gain of each node.

Then, the upper limit number determination unit 140 calculates the estimated interference amount to be given to the primary system by finding a product of the tentative transmission power and the path loss for each secondary system (step S115).

Then, the upper limit number determination unit 140 initializes a variable t for storing the number of secondary systems to 1 (step S116). Then, the upper limit number determination unit 140 selects t secondary systems (step S117). The selection of the secondary systems may be made according to an arbitrary standard such as order of time when the secondary system starts to operate, order of priority, or random system. Then, the upper limit number determination unit 140 calculates a sum of the estimated interference amounts of the t selected secondary systems (step S118).

Then, the upper limit number determination unit 140 determines whether the calculated sum of the estimated interference amounts is larger than the acceptable interference amount of the primary system (step S119). When the sum of the estimated interference amounts is not larger than the acceptable interference amount of the primary system, t+1 is substituted into t in step S120 (that is, t is incremented), and the processing returns to step S117. On the other hand, when the sum of the estimated interference amounts is larger than the acceptable interference amount of the primary system, the processing proceeds to step S121.

In step S121, the upper limit number determination unit 140 determines an upper limit number of power allocation targets per frequency channel based on the channels used by the t−1 secondary systems (step S121). For example, when the channels used by $t_1$ secondary systems among the t−1 secondary systems are equal to the frequency channels allocated to the primary system, the upper limit number determination unit 140 determines the upper limit number for the same channel as $t_1$. Similarly, the upper limit number determination unit 140 also determines an upper limit number of other frequency channels.

The upper limit number determination unit 140 may select a plurality of combinations of t secondary systems for selecting the secondary systems in step S117. In this case, when the sum of the estimated interference amounts is larger than the acceptable interference amount of the primary system also for any selected combination, the processing in step S119 may transit to step S121.

The upper limit number of power allocation targets determined by the upper limit number determination unit 140 may be the upper limit number of secondary systems or secondary communication nodes for which simultaneous secondary usage is permitted. "Simultaneous" herein is not "simultaneous" in a limited sense strictly indicating the same point of time on the time axis but may be "simultaneous" in a broad sense containing a certain offset in a temporal range. FIG. 8 illustrates a simultaneous usage number in a limited sense and a simultaneous usage number in a broad sense. In the example of FIG. 8, the simultaneous usage number in a limited sense does not exceed 3 at any point of time. On the other hand, the simultaneous usage number in a broad sense is 4 in the first period T1, 5 in the second period T2, 2 in the third period T3, and 4 in the fourth period T4. The simultaneous usage number in a broad sense is handled so that a time resolution of interference control is lowered while loads for the control processing can be restricted.

(2) Selection of Secondary Systems as Power Allocation Targets

In the second stage of FIG. 6, the power allocation unit 150 selects the secondary systems as transmission power allocation targets from among the secondary systems operated by the secondary communication nodes 200 registered in the data server 30 (step S130). The secondary systems as transmission power allocation targets refer to as many as the secondary systems not exceeding the upper limit number determined in the first stage among the secondary systems which can give a considerable level of interference to the primary system.

For example, for a secondary communication node 200 for which a distance between the secondary communication node 200 and the primary system exceeds a predetermined threshold, the power allocation unit 150 determines that an interference caused by the secondary system operated by the secondary communication node 200 is ignorable. The secondary system for which it is determined that an interference is ignorable is excluded from the transmission power allocation targets. The secondary systems can operate by their own requested transmission power without conforming to the power allocation by the communication control device 100.

A threshold for determining whether an interference is ignorable may be a common threshold for all the frequency channels or may be a different threshold per frequency channel. A threshold for the path loss depending on the distance may be used instead of a threshold for the distance.

Figure 9A:
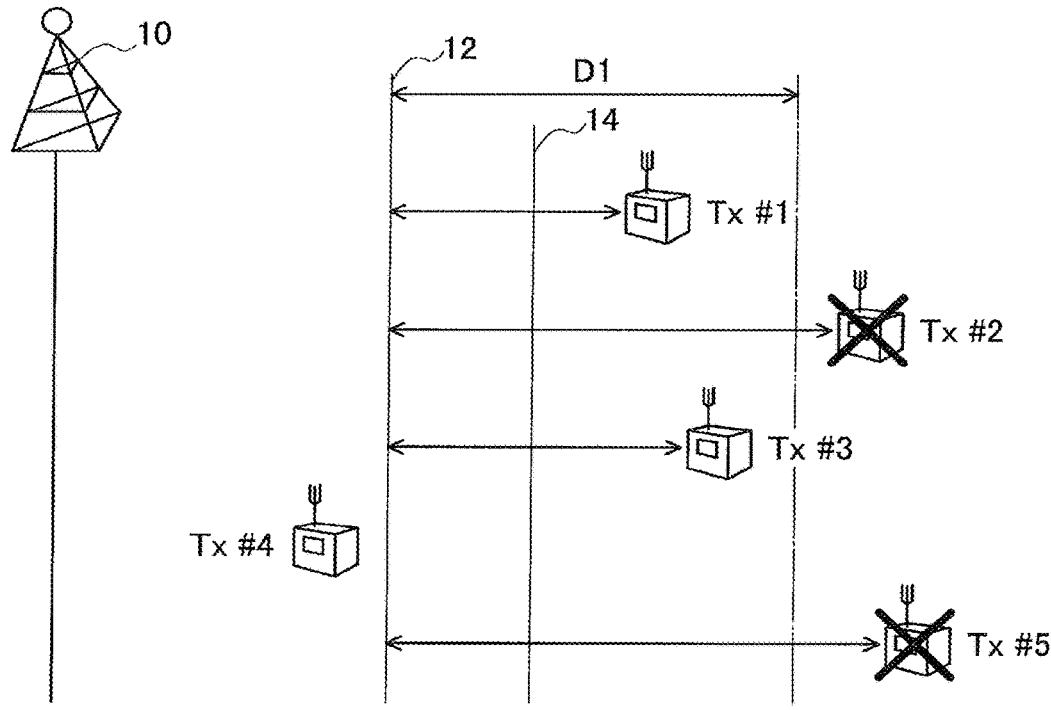
FIG. 9A is an explanatory diagram for explaining a first example of excluded targets for power allocation depending on a distance from a primary system.

For example, FIG. 9A illustrates a threshold D1 common for all the frequency channels for the distance from the boundary 12 of the service area of the primary system. The positions of the five secondary communication nodes 200 are also schematically illustrated. In the example of FIG. 9A, the first, third and fourth secondary communication nodes 200 among the five secondary communication nodes 200 are not away from the boundary 12 of the service area of the primary system to the outside beyond the threshold D1. Thus, the first, third and fourth secondary communication nodes 200 may be the transmission power allocation targets by the power allocation unit 150. For the fourth secondary communication node 200 positioned within the service area of the primary system, a distance to be compared with the threshold D1 may be assumed as zero. On the other hand, the distances from the second and fifth secondary communication nodes 200 to the boundary 12 exceed the threshold D1, respectively. Thus, a wireless signal transmitted from the second and fifth secondary communication nodes 200 has an ignorable level of interference given to the primary system, and the second and fifth secondary communication nodes 200 are excluded from the transmission power allocation targets by the power allocation unit 150.

Figure 9B:
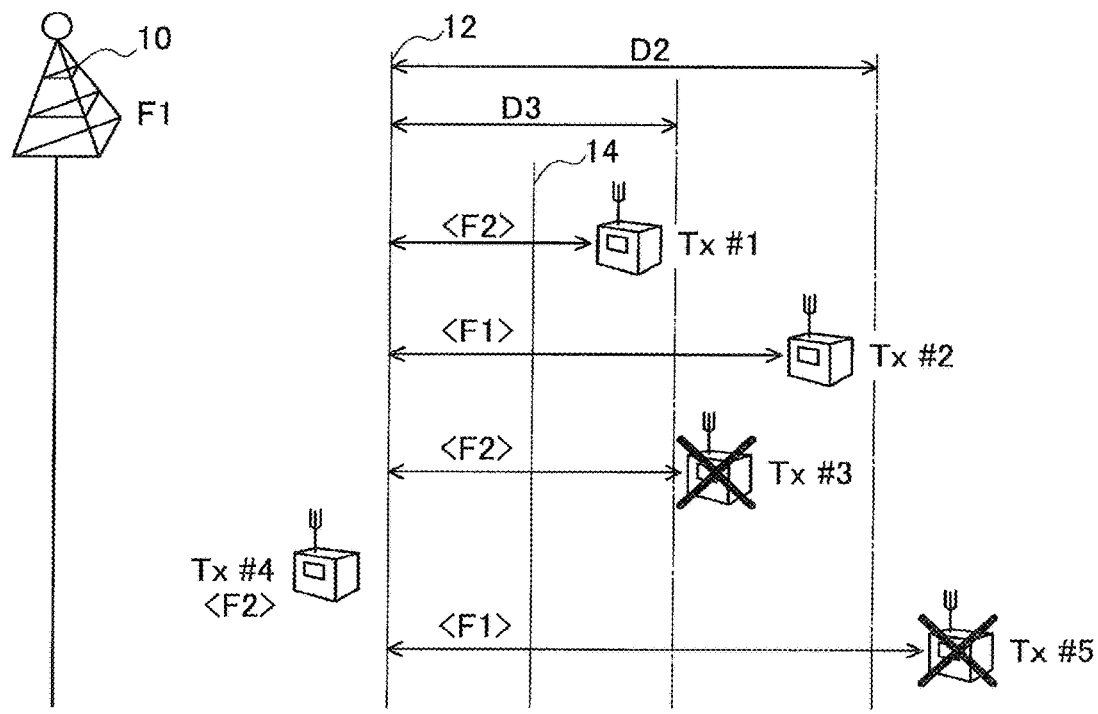
FIG. 9B is an explanatory diagram for explaining a second example of excluded targets for power allocation depending on a distance from a primary system.

FIG. 9B illustrates two thresholds D2 and D3 for the distances from the boundary 12. The threshold D2 is a threshold applied to the secondary system secondarily using the same channel (the channel F1 in the example of FIG. 9B) as the frequency channel allocated to the primary system. The third threshold D3 is a threshold applied to the secondary system secondarily using a different frequency channel from the channel F1. In the example of FIG. 9B, the second and fifth secondary communication nodes 200 among the five secondary communication nodes 200 secondarily use the channel F1. The second secondary communication node 200 is not away from the boundary 12 to the outside beyond the threshold D2. On the other hand, the distance between the fifth secondary communication node 200 and the boundary 12 exceeds the threshold D2. Thus, the fifth secondary communication node 200 is excluded from the transmission power allocation targets by the power allocation unit 150. The first, third and fourth secondary communication nodes 200 secondarily use the channel F2. The first and fourth secondary communication nodes 200 are not away from the boundary 12 to the outside beyond the threshold D3. On the other hand, the distance between the third secondary communication node 200 and the boundary 12 exceeds the threshold D3. Thus, the third secondary communication node 200 is excluded from the transmission power allocation targets by the power allocation unit 150. Under the condition with the same transmission power and path loss, an interference from the same channel is typically more fatal than an interference from a near channel, and thus the threshold D2 may be set to be larger than the threshold D3.

In this way, the secondary systems for which an interference is ignorable are excluded from the transmission power allocation targets, and thus the calculation amount for the power allocation processing described later can be reduced. A different threshold per frequency channel is used, thereby evaluating an impact of interference more accurately.

Then, the power allocation unit 150 compares the number of remaining secondary systems not excluded with the upper limit number determined by the upper limit number determination unit 140. Then, when the number of secondary systems exceeds the upper limit number, the power allocation unit 150 determines to deny transmission power allocation to as many as the secondary systems corresponding to the differential. For example, the power allocation unit 150 may determine the secondary systems for which transmission power allocation is denied based on the priority of the secondary system, the communication history or the communication quality requirement. The secondary communication node 200 in the secondary system for which transmission power allocation is denied may wait for transmission power to be allocated. The power allocation unit 150 performs the power allocation processing described later on as many as the secondary systems equal to or less than the upper limit number determined by the upper limit number determination unit 140.

(3) Power Allocation Processing (3-1) First Example

Figure 10A:
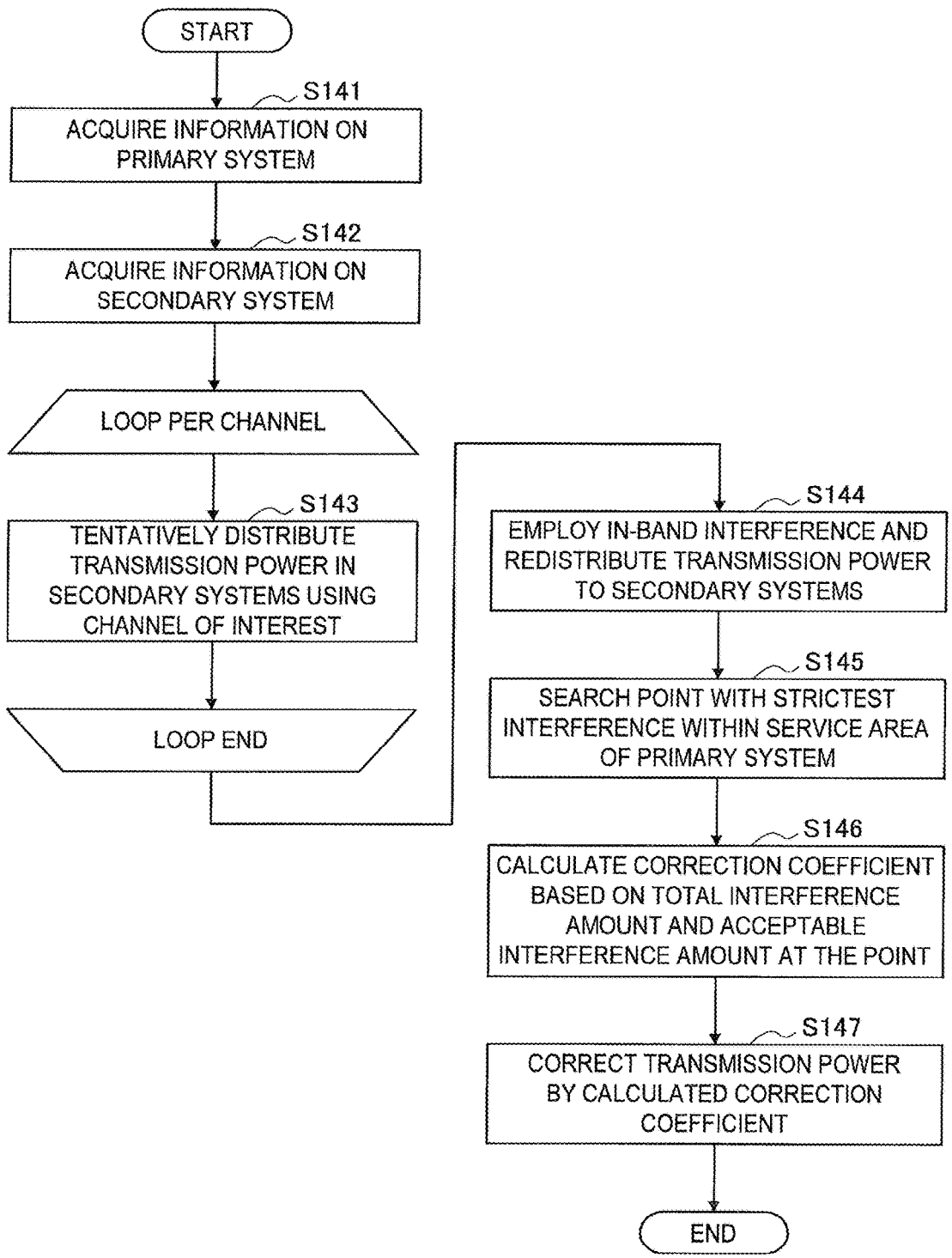
FIG. 10A is a flowchart illustrating a first example of a flow of a power allocation processing according to one embodiment.

FIG. 10A is a flowchart illustrating the first example of a flow of the power allocation processing by the power allocation unit 150. In the first example, the power allocation unit 150 tentatively distributes transmission power to the secondary systems secondarily using the frequency channel per frequency channel, and then redistributes the tentatively-distributed transmission power in consideration of an impact between the different frequency channels. Then, the power allocation unit 150 corrects the distributed or redistributed transmission power to meet formula (2) in the interference control model.

With reference to FIG. 10A, the power allocation unit 150 first acquires the information on the primary system provided from the data server 30 from the storage unit 130 (step S141). The power allocation unit 150 acquires the information on the secondary system collected from the secondary communication nodes 200 from the storage unit 130 (step S142). Then, the power allocation unit 150 repeats the processing in step S143 per frequency channel used by the secondary system.

In step S143, the power allocation unit 150 tentatively distributes transmission power between the secondary systems using a channel of interest (step S143). The tentative distribution of transmission power may be performed according to any of three systems including fixed margin system, equal system and unequal system described later, for example.

(Fixed Margin System)

The first system is a fixed margin system. In the fixed margin system, a fixedly-preset distribution margin MI (and safety margin SM) is used so that transmission power to be distributed to each secondary systems is easily calculated. In this case, calculation cost for distributing transmission power is reduced. Transmission power $P(f_j, k)$ tentatively distributed to the k-th secondary system using the frequency channel $f_j$ is derived from the following formula.

[Math. 5]
$$P(f_j,k)=I_{acceptable}(i,f_j)/L(i,f_j,k) \cdot G(f_j,k) \cdot MI \cdot SM \qquad (5)$$

(Equal System)

The second system is an equal system. In the equal system, transmission power distributed in the respective secondary systems is equal to each other. That is, transmission power is equally distributed in a plurality of secondary systems. The transmission power $P(f_j, k)$ tentatively distributed to the k-th secondary system using the frequency channel $f_j$ is derived from the following formula.

[Math. 6]
$$P(f_j, k) = I_{acceptable}(i, f_j)/\sum_{kk=1}^{M_j} \{L(i, f_j, kk) \cdot G(f_j, kk)\} \qquad (6)$$

(Unequal System)

The third system is an unequal system. In the unequal system, more transmission power is distributed to a secondary system having a larger distance from the primary system. Thereby, a chance of secondary usage can be entirely enhanced. The transmission power $P(f_j, k)$ tentatively distributed to the k-th secondary system using the frequency channel $f_j$ is derived from the following formula.

[Math. 7]
$$P(f_j,k)=I_{acceptable}(i,f_j)/\{L(i,f_j,k) \cdot G(f_j,k) \cdot M_j\} \qquad (7)$$

The equal system and the unequal system may be combined with an applied interference margin reduction system described below.

(Applied Interference Margin Reduction System)

The applied interference margin reduction system is directed for employing the safety margin SM for reducing a risk of interference, and can be used in a combination with the equal system or unequal system. The transmission power $P(f_j, k)$ is derived from the following formula (8) in a combination with the equal system and from the following formula (9) in a combination with the unequal system. SM indicates a safety margin preset or notified from the secondary communication node 200.

[Math. 8]
$$P(f_j, k) = I_{acceptable}(i, f_j)/\sum_{kk=1}^{M_j} \{L(i, f_j, kk) \cdot G(f_j, kk) \cdot SM\} \qquad (8)$$

$$P(f_j, k) = I_{acceptable}(i, f_j)/\{L(i, f_j, k) \cdot G(f_j, k) \cdot M_j \cdot SM\} \qquad (9)$$

Each system described above may be combined with a weighting distribution system described below.

(Weighting Distribution System)

The weighting distribution system is directed for weighting transmission power distribution depending on a priority per secondary system. The transmission power $P(f_j, k)$ is derived from the following formula (10) in a combination with the equal system and from the following formula (11) in a combination with the unequal system. The transmission power $P(f_j, k)$ is derived from the following formula (10') in a combination of the equal system and the applied interference margin reduction system and from the following formula (11') in a combination of the unequal system and the applied interference margin reduction system. $w_k$ indicates a weight depending on a priority. A weight $w_j$ per frequency channel may be used instead of the weight $w_k$ per secondary system.

[Math. 9]

$$P(f_j, k) = \left(w_k / \sum_{kk=1}^{M_j} w_{kk}\right) I_{acceptable}(i, f_j) / \sum_{kk=1}^{M_j} \{L(i, f_j, kk) \cdot G(f_j, kk)\} \quad (10)$$

$$P(f_j, k) = \left(w_k / \sum_{kk=1}^{M_j} w_{kk}\right) I_{acceptable}(i, f_j) / \{L(i, f_j, k) \cdot G(f_j, k) \cdot M_j\} \quad (11)$$

$$P(f_j, k) = \quad (10')$$
$$\left(w_k / \sum_{kk=1}^{M_j} w_{kk}\right) I_{acceptable}(i, f_j) / \sum_{kk=1}^{M_j} \{L(i, f_j, kk) \cdot G(f_j, kk) \cdot SM\}$$

$$P(f_j, k) = \left(w_k / \sum_{kk=1}^{M_j} w_{kk}\right) I_{acceptable}(i, f_j) / \{L(i, f_j, k) \cdot G(f_j, k) \cdot M_j \cdot SM\} \quad (11')$$

When the processing in step S143 is terminated for all the frequency channels used by the secondary systems, the power allocation unit 150 further employs an inter-band interference, and redistributes transmission power in the secondary systems (step S144). For example, transmission power is redistributed in the equal system according to formula (12) (formula (12') in a combination with the applied interference margin reduction system), for example.

[Math. 10]

$$P'(f_j, k) = \frac{I_{acceptable}(i, f_j) - \sum_{jj=1}^{O_j} \sum_{kk=1}^{N_{jj}} \{P(f_{jj}, kk) \cdot L(i, f_{jj}, kk) \cdot G(f_{jj}, kk) / H(f_j, f_{jj}, kk)\}}{\sum_{kk=1}^{M_j} \{L(i, f_j, kk) \cdot G(f_j, kk)\}} \quad (12)$$

$$P'(f_j, k) = \frac{I_{acceptable}(i, f_j) - \sum_{jj=1}^{O_j} \sum_{kk=1}^{N_{jj}} \{P(f_{jj}, kk) \cdot L(i, f_{jj}, kk) \cdot G(f_{jj}, kk) / H(f_j, f_{jj}, kk)\}}{\sum_{kk=1}^{M_j} \{L(i, f_j, kk) \cdot G(f_j, kk) \cdot SM\}} \quad (12')$$

Formula (12) indicates that the acceptable interference amount obtained by subtracting the interference amount caused by the use of a near channel from the acceptable interference amount of the primary system is redistributed between the remaining secondary systems. Similarly, transmission power can be redistributed in the unequal system according to the following formula (13) (formula (13') in a combination with the applied interference margin reduction system).

[Math. 11]

$$P'(f_j, k) = \frac{I_{acceptable}(i, f_j) - \sum_{jj=1}^{O_j} \sum_{kk=1}^{N_{jj}} \{P(f_{jj}, kk) \cdot L(i, f_{jj}, kk) \cdot G(f_{jj}, kk) / H(f_j, f_{jj}, kk)\}}{L(i, f_j, k) \cdot G(f_j, k) \cdot M_j} \quad (13)$$

-continued $$P'(f_j, k) = \frac{I_{acceptable}(i, f_j) - \sum_{jj=1}^{O_j} \sum_{kk=1}^{N_{jj}} \{P(f_{jj}, kk) \cdot L(i, f_{jj}, kk) \cdot G(f_{jj}, kk) / H(f_j, f_{jj}, kk)\}}{L(i, f_j, k) \cdot G(f_j, k) \cdot M_j \cdot SM} \quad (13')$$

Of course, a weight in the weighting distribution system may be further applied to each mathematical formula described above for redistribution.

Then, the power allocation unit 150 searches a point where the interference amount evaluated based on the redistributed transmission power is the strictest within the service area of the primary system (step S145). For example, a point i' where the interference amount is the strictest is searched as in the following formula (14) or formula (14').

[Math. 12]

$$i' = \operatorname*{argmin}_i \left( I_{acceptable}(i, f_j) - \sum_{k=1}^{M_j} P'(f_j, k) \cdot L(i, f_j, k) \cdot G(f_j, k) - \sum_{jj=1}^{O_j} \sum_{kk=1}^{N_{jj}} \{P'(f_{jj}, kk) \cdot L(i, f_{jj}, kk) \cdot G(f_{jj}, kk) / H(f_j, f_{jj}, kk)\} \right) \quad (14)$$

$$i' = \operatorname*{argmin}_i \left( I_{acceptable}(i, f_j) - \sum_{k=1}^{M_j} P'(f_j, k) \cdot L(i, f_j, k) \cdot G(f_j, k) \cdot SM - \sum_{jj=1}^{O_j} \sum_{kk=1}^{N_{jj}} \{P'(f_{jj}, kk) \cdot L(i, f_{jj}, kk) \cdot G(f_{jj}, kk) \cdot SM / H(f_j, f_{jj}, kk)\} \right) \quad (14')$$

Then, the power allocation unit 150 calculates a correction coefficient Δ for power distribution as in the following formula based on the total interference amount and the acceptable interference amount $I_{acceptable}(i, f_j)$ at the point i' (step S146).

[Math. 13]

$$\Delta = \frac{I_{acceptable}(i', f_j)}{\sum_{k=1}^{M_j} P'(f_j, k) \cdot L(i', f_j, k) \cdot G(f_j, k) + \sum_{jj=1}^{O_j} \sum_{kk=1}^{N_{jj}} \{P'(f_{jj}, kk) \cdot L(i', f_{jj}, kk) \cdot G(f_{jj}, kk) / H(f_j, f_{jj}, kk)\}} \quad (15)$$

$$\Delta = \frac{I_{acceptable}(i', f_j)}{\sum_{k=1}^{M_j} P'(f_j, k) \cdot L(i', f_j, k) \cdot G(f_j, k) \cdot SM + \sum_{jj=1}^{O_j} \sum_{kk=1}^{N_{jj}} \{P'(f_{jj}, kk) \cdot L(i', f_{jj}, kk) \cdot G(f_{jj}, kk) \cdot SM / H(f_j, f_{jj}, kk)\}} \quad (15')$$

Formula (15') can be used when the applied interference margin reduction system is applied to power distribution.

Then, the power allocation unit 150 uses the calculated correction coefficient Δ to correct transmission power to be allocated to the secondary system according to the following formula (step S147).

[Math. 14]

$$P''(f_j, k) = P'(f_j, k) \cdot \Delta \quad (16)$$

(3-2) Second Example

Figure 10B:
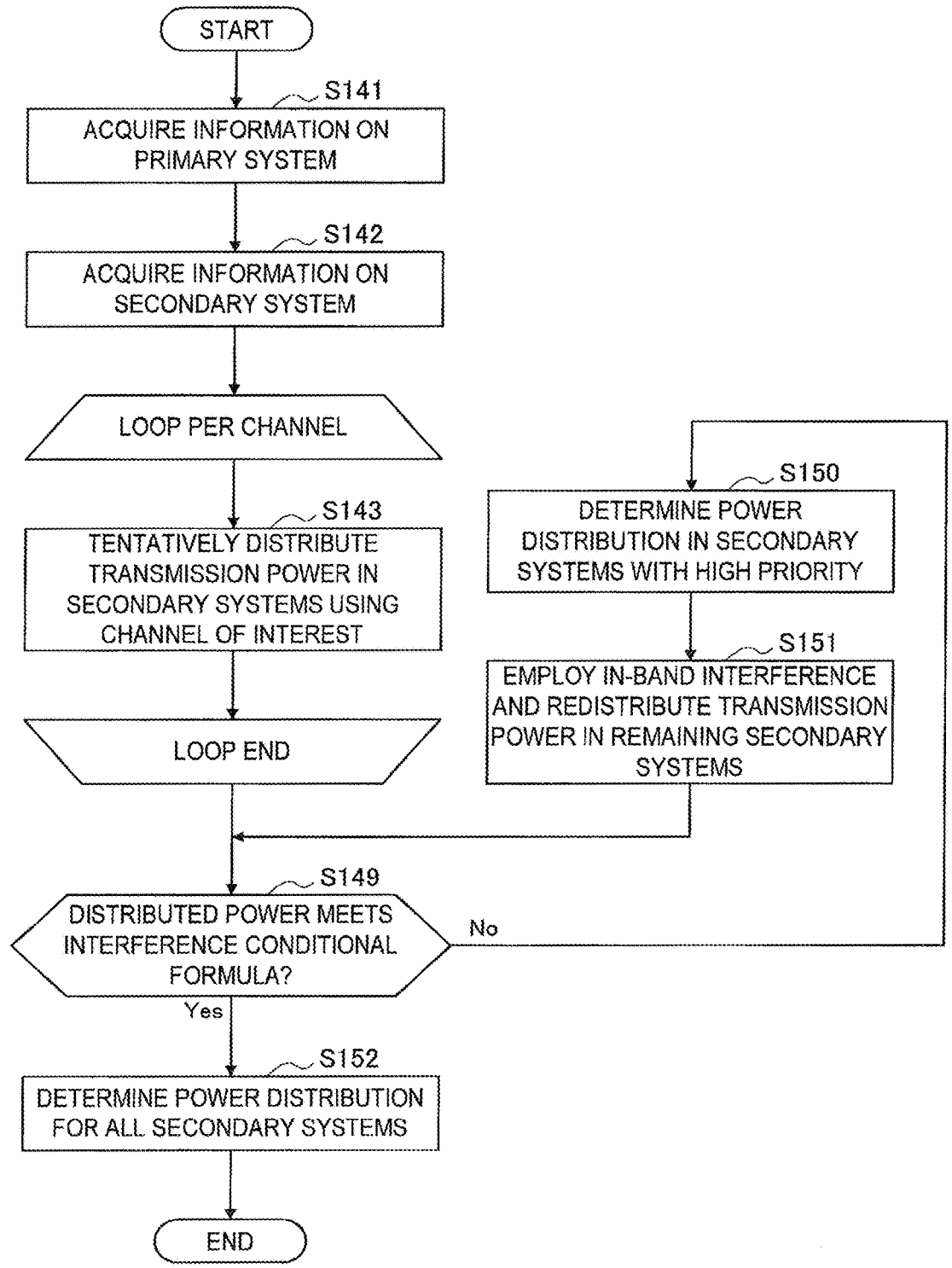
FIG. 10B is a flowchart illustrating a second example of a flow of the power allocation processing according to one embodiment.

FIG. 10B is a flowchart illustrating the second example of a flow of the power allocation processing by the power allocation unit 150. In the second example, the power allocation unit 150 tentatively distributes transmission power to the secondary systems secondarily using the frequency channel per frequency channel as in the first example, and then redistributes the tentatively-distributed transmission power in consideration of an impact in different frequency channels. In the second example, the power allocation unit 150 determines the tentatively-distributed transmission power in a stepwise manner depending on a priority per secondary system or frequency channel, for example.

In the example of FIG. 10B, at first, the power allocation unit 150 tentatively distributes transmission power per channel for all the frequency channels used by the secondary systems, as in the first example (step S141 to step S143). Then, the power allocation unit 150 determines whether the tentatively-distributed transmission power meets formula (2) in the interference control model (step S149). When formula (2) is not met, the processing proceeds to step S150.

In step S150, the power allocation unit 150 determines power distribution in the secondary system with a higher priority among the secondary systems for which power distribution is not determined (step S150). For example, the power allocation unit 150 may determine the transmission power tentatively distributed to the secondary system with a higher priority as transmission power to be allocated to the secondary system. Instead, the power allocation unit 150 may determine a value obtained by multiplying the tentatively-distributed transmission power by a weight depending on the priority as transmission power to be allocated to the secondary system.

Then, the power allocation unit 150 employs an inter-band interference, and redistributes transmission power to the remaining secondary systems for which power distribution is not determined (step S151). The calculation formulas for redistribution may be the same as the above formula (12) or (13).

Thereafter, when formula (2) is met in step S149, the power allocation unit 150 determines the tentatively-distributed transmission power or redistributed transmission power as transmission power to be allocated to the secondary system for all the secondary systems (step S152).

(3-3) Third Example

In the third example of the power allocation processing, the power allocation unit 150 determines transmission power allocation without tentatively distributing transmission power per frequency channel, unlike the first example and the second example.

When a difference between the left side and the right side in formula (2) is assumed as $D_j$, formula (2) can be expressed as follows.

[Math. 15]

$$I_{acceptable}(i, f_j) = \sum_{k=1}^{M_j} P(f_j, k) \cdot L(i, f_j, k) \cdot G(f_j, k) + \sum_{jj=1}^{O_j} \sum_{kk=1}^{N_{jj}} \{P(f_{jj}, kk) \cdot L(i, f_{jj}, kk) \cdot G(f_{jj}, kk)/H(f_j, f_{jj}, kk)\} + D_j \quad (17)$$

Herein, it is assumed that the acceptable interference amount $I_{acceptable}(i, f_j)(j=1, \ldots, O_j)$ for each frequency channel is given. Transmission power to be allocated to each of $M_j + N_{jj}$ secondary systems is assumed as $P_s$ (s=1, ..., $M_j + N_{jj}$). Formula (17) is extended so that the following relational formula is established between an $O_j$-dimensional acceptable interference amount vector and an $M_j + N_{jj}$-dimensional transmission power vector.

[Math. 16]

$$\begin{bmatrix} I_{acceptable}(i, f_1) \\ I_{acceptable}(i, f_2) \\ \vdots \\ I_{acceptable}(i, f_{Oj}) \end{bmatrix} = \begin{bmatrix} a_{1,1} & \cdots & a_{Mj+Njj,1} \\ \vdots & \ddots & \vdots \\ a_{1,Oj} & \cdots & a_{Mj+Njj,Oj} \end{bmatrix} \begin{bmatrix} P_1 \\ P_2 \\ \vdots \\ P_{Mj+Njj} \end{bmatrix} + \begin{bmatrix} D_1 \\ D_2 \\ \vdots \\ D_{Oj} \end{bmatrix} \quad (18)$$

A coefficient $a_{s,j}$ for the transmission power $P_s$ for the s-th secondary system at the j-th frequency channel, which appears in formula (18), can be calculated based on the path loss L, the gain component G and the loss component H in the interference control model. Thus, the power allocation unit 150 can calculate the transmission power vector ($P_1, \ldots, P_{Mj+Njj}$) by calculating a coefficient matrix of formula (18) and then deriving the solution of formula (18).

It is assumed that the acceptable interference amount vector is $I_{acceptable}$, the transmission power vector is $P_{tx}$, and the coefficient matrix is A. Formula (18) is expressed as follows. An element of the vector D corresponding to the margin may be a fixed value or zero.

[Math. 17]

$$I_{acceptable} = A \cdot P_{tx} + D \quad (19)$$

For example, when the number of secondary systems $M_j + N_{jj}$ is equal to the number of frequency channels $O_j$, the power allocation unit 150 can calculate the transmission power vector ($P_1, \ldots, P_{Mj+Njj}$) as follows by use of the inverse matrix of the coefficient matrix A as a square matrix.

[Math. 18]

$$P_{tx} = A^{-1}(I_{acceptable} - D) \quad (20)$$

When the number of secondary systems $M_j + N_{jj}$ is not equal to the number of frequency channels $O_j$, the power allocation unit 150 may determine one transmission power vector selected from the solutions of the transmission power vector as the solution of the transmission power to be allocated to each secondary system. The solution of formula (18) may be an approximate solution. A number obtained by multiplying the number of secondary systems to be considered per channel as in the following formula, instead of the number of secondary systems $M_j + N_{jj}$, may be handled as a dimensional number of the transmission power vector.

[Math. 19]

$$M_j + \sum_{jj=1}^{O_j} N_{jj} \quad (21)$$

Figure 10C:
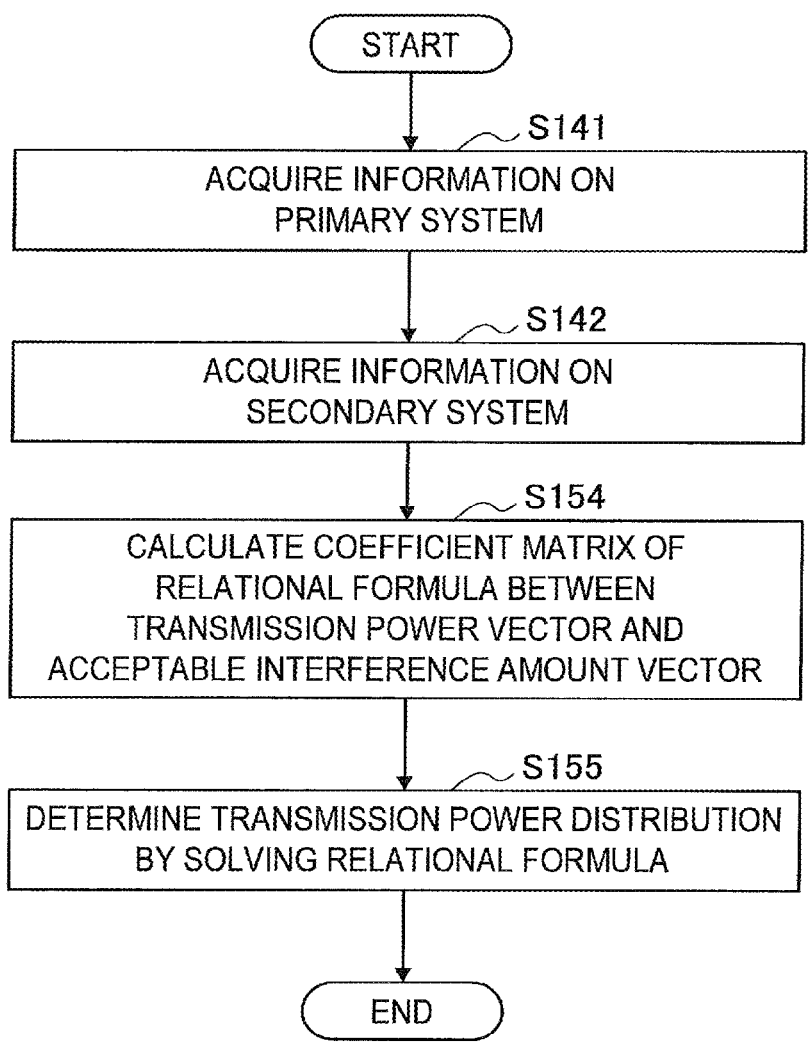
FIG. 10C is a flowchart illustrating a third example of a flow of the power allocation processing according to one embodiment.

FIG. 10C is a flowchart illustrating the third example of a flow of the power allocation processing by the power allocation unit 150.

With reference to FIG. 10C, at first, the power allocation unit 150 acquires the information on the primary system provided from the data server 30 from the storage unit 130

(step S141). The information acquired herein includes the acceptable interference amount vector $I_{acceptable}$ in formula (18). The power allocation unit 150 acquires the information on the secondary system collected from the secondary communication nodes 200 from the storage unit 130 (step S142).

Then, the power allocation unit 150 calculates the coefficient matrix A in a relational formula between the transmission power vector $P_{tx}$ and the acceptable interference amount vector $I_{acceptable}$ according to the interference control model (step S154). Thereby, the relational formula between the transmission power vector $P_{tx}$ and the acceptable interference amount vector $I_{acceptable}$ is formed as in formula (18). Then, the power allocation unit 150 determines transmission power distribution by solving the formed relational formula (step S155).

(4) Readjustment of Transmission Power

When determining the transmission power allocation to the secondary systems according to the above method, the communication control device 100 notifies a value of the allocated transmission power in a reconfiguration request to the secondary communication node 200. Thereafter, a new secondary communication node 200 can start operating the secondary system. In this case, the communication control device 100 may perform the power adjustment processing illustrated in FIG. 6 again and may reallocate the transmission power to the existing secondary system and the new secondary system. Instead, the communication control device 100 may readjust the transmission power previously allocated to the existing secondary system and additionally allocate the transmission power to the new secondary system as described later.

FIG. 11 is a flowchart illustrating an exemplary flow of a power readjustment processing by the communication control device 100. With reference to FIG. 11, at first, the power allocation unit 150 waits for the new secondary system to be operated (step S161). For example, the communication unit 110 receives an interference control request from the secondary communication node 200 so that the power allocation unit 150 recognizes the start of operating the new secondary system. The processing then proceeds to step S162.

In step S162, the power allocation unit 150 calculates an excess communication quality for the required communication quality depending on the allocated transmission power for each of the existing secondary systems (step S162). For example, a communication distance between the secondary communication nodes within the k-th secondary system at the frequency channel $f_j$ is assumed as R and the required communication quality is assumed as $SINR_{req}(f_j, k, R)$. The communication quality depending on the allocated transmission power is assumed as $SINR_{est}(f_j, k, R)$. Then, an excess rate $\alpha_{fj, k}$ of transmission power for the secondary system is derived as follows.

[Math. 20]

$$\alpha_{fj,k}=SINR_{est}(f_j,k,R)/SINR_{req}(f_j,k,R) \quad (22)$$

Then, the power allocation unit 150 determines whether excess transmission power is present for each secondary system (step S163). For example, when the excess rate $\alpha_{fj, k}$ calculated by formula (22) is larger than 1.0, the power allocation unit 150 can determine that excess transmission power is present for the secondary system. Then, the power allocation unit 150 recalculates the transmission power for the secondary system for which excess transmission power is present according to the following formula (step S164).

[Math. 21]

$$P_{opt}(f_j,k)=P(f_j,k)\cdot\alpha_{fj,k} \quad (23)$$

In formula (23), $P(f_j, k)$ indicates allocated transmission power, and $P_{opt}(f_j, k)$ indicates recalculated transmission power.

When terminating the recalculation of the transmission power for the existing secondary system in this way, the power allocation unit 150 determines whether transmission power can be distributed to the new secondary system (step S165). For example, when the existing secondary system in which excess transmission power is present reduces the transmission power, thereby to accept a new secondary system, the power allocation unit 150 determines that transmission power can be distributed to the new secondary system. When it is determined that transmission power cannot be distributed to the new secondary system, transmission power is not distributed to the new secondary system and the transmission power readjustment processing of FIG. 11 terminates. On the other hand, when it is determined that transmission power can be distributed to the new secondary system, the processing proceeds to step S166.

In step S166, the power allocation unit 150 transmits a reconfiguration request to at least one secondary communication node 200 in the existing secondary system, thereby to request to reduce the transmission power (step S166). When a room for accepting the new secondary system is generated, the power allocation unit 150 allocates transmission power to the new secondary system, and notifies a value of the transmission power to the secondary communication node 200 in the secondary system (step S167).

With the transmission power readjustment processing, the new secondary system can start to operate at lower calculation cost than the transmission power adjustment processing is performed again for all the secondary systems.

The storage unit 130 in the communication control device 100 may hold a secondary system management table as illustrated in FIG. 12 and may store information on required quality of each secondary system, calculation result of excess rate, and allocation of transmission power. In the example of FIG. 12, an ID (identifier) of the secondary system is held per channel number, and the required quality for each secondary system, the excess rate, and the latest allocation of transmission power are stored in the secondary system management table.

(5) To Deny or Hold Operation Start

In the above example, when the new secondary communication node 200 starts operating the secondary system, the communication control device 100 readjusts the transmission power previously allocated to the existing secondary system. To the contrary, the communication control device 100 may deny or hold the start of operating the new secondary system depending on the predetermined maximum number of secondary systems or secondary communication nodes.

Figure 13A:
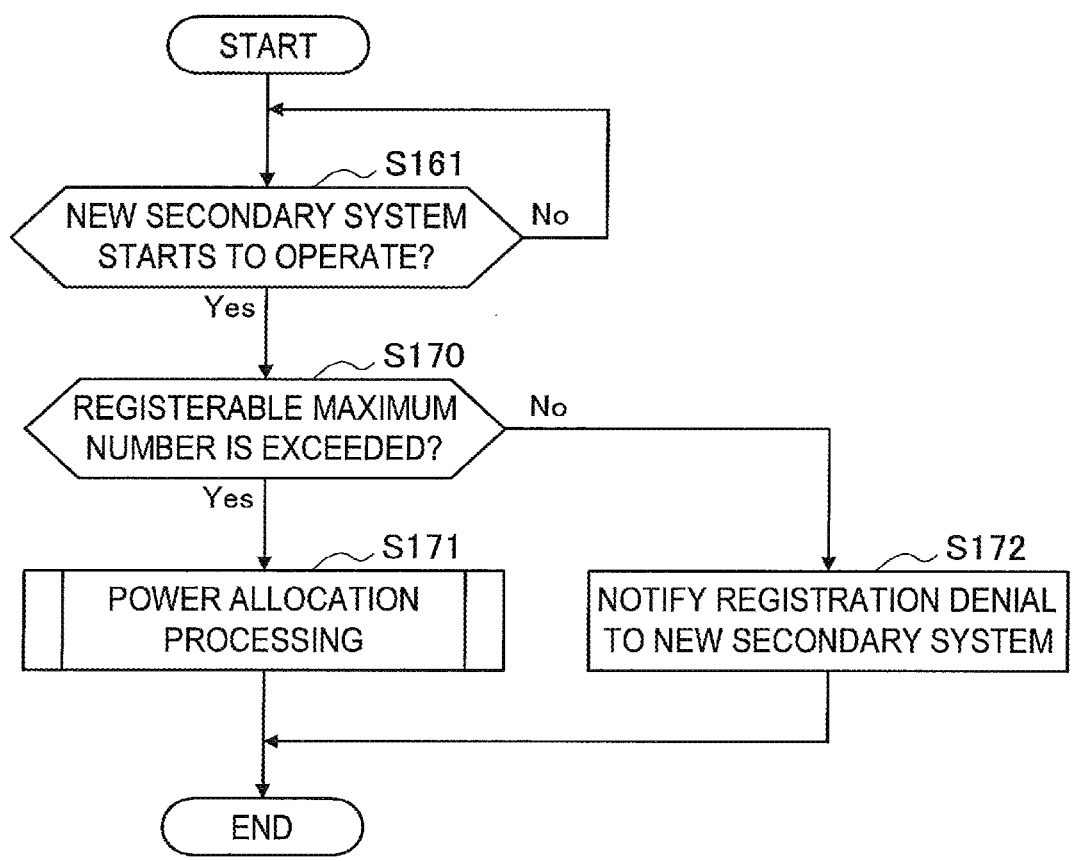
FIG. 13A is a flowchart illustrating a first example of a flow of a processing when the start of operating a secondary system is denied according to one embodiment.

FIG. 13A is a flowchart illustrating the first example of a flow of a processing when the start of operating the secondary system is denied. With reference to FIG. 13A, at first, the power allocation unit 150 waits for the new secondary system to be operated (step S161). For example, the communication unit 110 receives an interference control request from the secondary communication node 200 so that the power allocation unit 150 recognizes the start of operating the new secondary system. The processing then proceeds to step S170.

In step S170, the new secondary system starts to operate so that the power allocation unit 150 determines whether the number of secondary systems or secondary communication nodes exceeds the registerable maximum number previously determined (step S170). Herein, when it is determined that the registerable maximum number is not exceeded, the power allocation processing by the power allocation unit 150 (or the power readjustment processing illustrated in FIG. 11) is performed (step S171). On the other hand, when it is determined that the registerable maximum number is exceeded, the power allocation unit 150 notifies, to the secondary communication node 200 in the secondary system, that the registration of the new secondary system is defined (step S172).

Figure 13B:
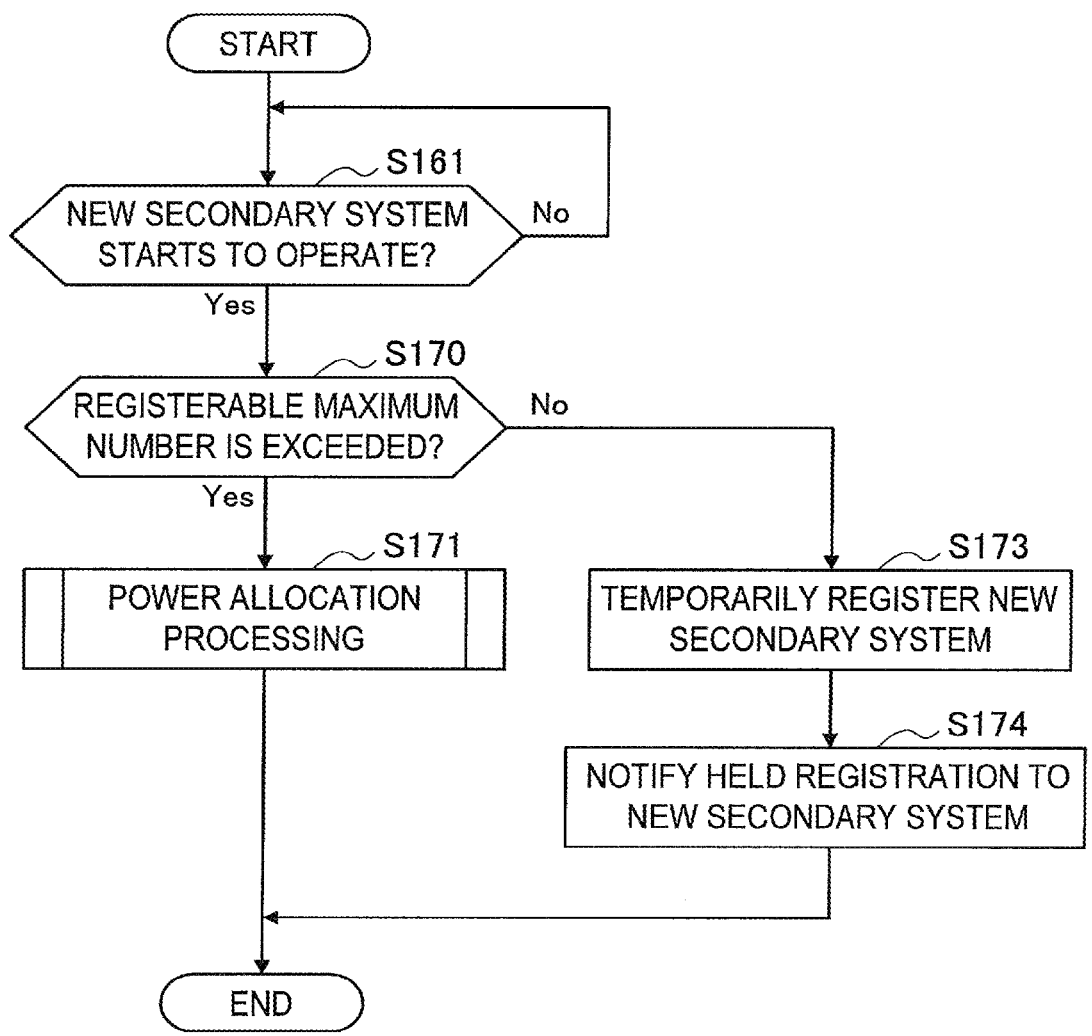
FIG. 13B is a flowchart illustrating an exemplary flow of a processing when the start of operating a secondary system is held according to one embodiment.

FIG. 13B is a flowchart illustrating an exemplary flow of a processing when the start of operating the secondary system is held. With reference to FIG. 13B, at first, the power allocation unit 150 waits for the new secondary system to be operated (step S161). For example, the communication unit 110 receives an interference control request from the secondary communication node 200 so that the power allocation unit 150 recognizes the start of operating the new secondary system. The processing then proceeds to step S170.

In step S170, the new secondary system starts to operate so that the power allocation unit 150 determines whether the number of secondary systems or secondary communication nodes exceeds the registerable maximum number previously determined (step S170). Herein, when it is determined that the registerable maximum number is not exceeded, the power allocation processing by the power allocation unit 150 (or the power readjustment processing illustrated in FIG. 11) is performed (step S171). On the other hand, when it is determined that the registerable maximum number is exceeded, the power allocation unit 150 registers only the data on the secondary system (or temporarily registers the secondary system) without allocating transmission power to the new secondary system (step S173). Then, the power allocation unit 150 notifies, to the secondary communication node 200 in the secondary system, that power is not allocated and registration is held (step S174). Thereafter, when the existing secondary system stops operating, for example, transmission power is preferentially allocated to the secondary system whose registration is held.

Figure 13C:
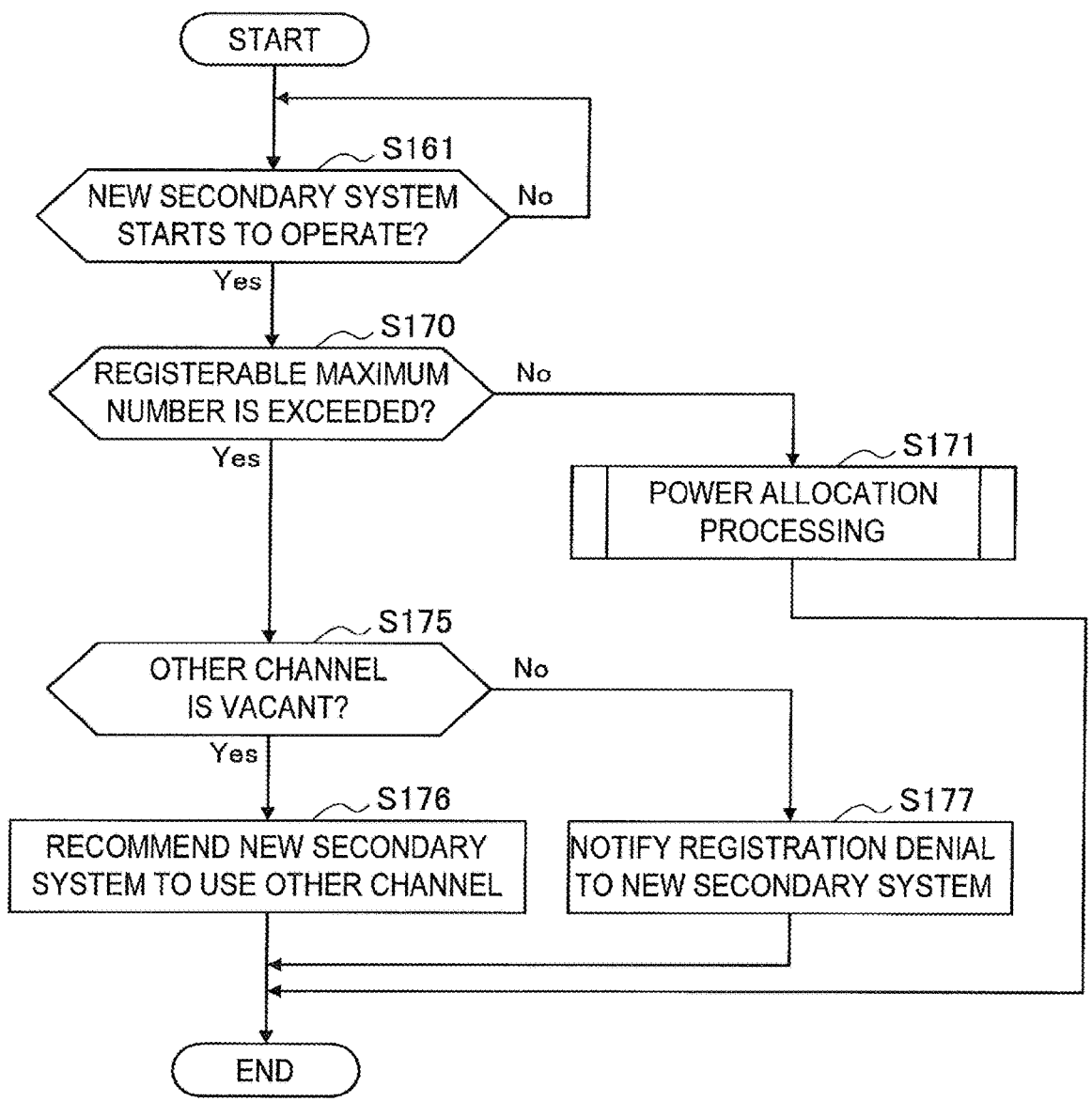
FIG. 13C is a flowchart illustrating a second example of a flow of a processing when the start of operating a secondary system is denied according to one embodiment.

FIG. 13C is a flowchart illustrating the second example of a flow of a processing when the start of operating the secondary system is denied. In the third example, it is assumed that the maximum number of secondary systems or secondary communication nodes registerable in the data server 30 or the communication control device 100 is previously determined per frequency channel.

With reference to FIG. 13C, at first, the power allocation unit 150 waits for the new secondary system to be operated (step S161). For example, the communication unit 110 receives an interference control request from the secondary communication node 200 so that the power allocation unit 150 recognizes the start of operating the new secondary system. The processing then proceeds to step S170.

In step S170, the new secondary system starts to operate so that the power allocation unit 150 determines whether the number of secondary systems or secondary communication nodes exceeds the registerable maximum number for a target channel (step S170). Herein, when it is determined that the registerable maximum number is not exceeded, the power allocation processing by the power allocation unit 150 (or the power readjustment processing illustrated in FIG. 11) is performed (step S171).

On the other hand, in step S170, when it is determined that the registerable maximum number is exceeded, the power allocation unit 150 determines whether the other channel is vacant (step S175). Herein, when the other channel is vacant, the power allocation unit 150 recommends the secondary communication node 200 in the new secondary system to use the vacant channel (step S176). On the other hand, when the other channel is not vacant, the power allocation unit 150 notifies, to the secondary communication node 200 in the secondary system, that the registration of the new secondary system is denied (step S177).

(6) Distance Between Primary System and Secondary System

In the upper limit number determination processing and the power allocation processing illustrated in FIG. 6, a distance between the primary system and each secondary system needs to be determined in order to derive a path loss per secondary system. The distance between the primary system and each secondary system can be defined according to any example described later, for example.

(6-1) First Example

In the first example, the distance between the primary system and each secondary system is a minimum distance from the position of each secondary system to the outer periphery of the service area of the primary system.

Figure 14A:
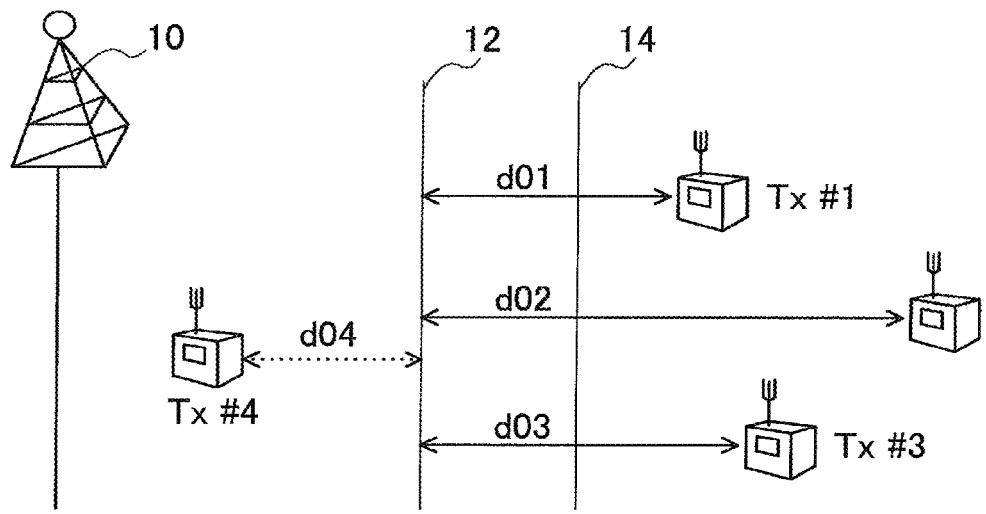
FIG. 14A is an explanatory diagram illustrating a first example of a definition of a distance between a primary system and each secondary system.

For example, FIG. 14A illustrates the boundary 12 corresponding to the outer periphery of the service area of the primary system, and four secondary systems (secondary communication nodes 200). The first, second and third secondary systems are positioned outside the service area of the primary system. The minimum distances from the first, second and third secondary systems to the outer periphery of the service area of the primary system are d01, d02 and d03, respectively. On the other hand, the fourth secondary system is positioned within the service area of the primary system. The distances between the primary system and the secondary systems may be assumed as zero when a path loss is derived for the fourth secondary system. In this case, the path loss is maximum. Instead, the minimum distance between the fourth secondary system and the boundary 12 may be handled as the distance between the primary system and the fourth secondary system.

(6-2) Second Example

In the second example, the distance between the primary system and each secondary system is a distance from the position of each secondary system to a certain point on the outer periphery of the service area of the primary system or within the outer periphery. The certain point may be a point on the outer periphery of the service area of the primary system closest to a secondary system. The certain point may be a point where a sum of the distances from the secondary systems is minimum. The point may be considered as a point where a virtual reception station of the primary system subjected to an interference from the secondary system is positioned.

Figure 14B:
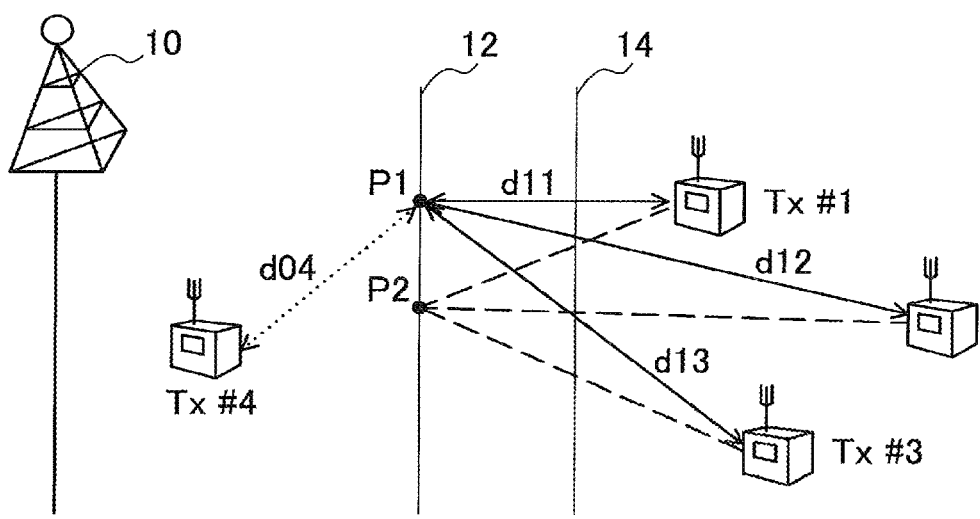
FIG. 14B is an explanatory diagram for explaining a second example of a definition of a distance between a primary system and each secondary system.

For example, FIG. 14B illustrates the boundary 12 and four secondary systems again. The first, second and third secondary systems are positioned outside the service area of the primary system. A point on the boundary 12 closest to the first secondary system is assumed as P1. The distances between the first, second and third secondary systems and the primary system correspond to the distances d11, d12, and d13 between the first, second and third secondary systems and the point P1, respectively. On the other hand, the fourth secondary system is positioned within the service area of the primary system. As in the first example, the distances between the primary system and the secondary systems may be assumed as zero when a path loss for the fourth secondary system is acquired. Instead, the distance between the fourth secondary system and the point P1 may be handled as the distance between the primary system and the fourth secondary system.

In FIG. 14B, a point P2 on the boundary 12 is where a sum of the distances from the first, second and third secondary systems is minimum. The point P2 may be used instead of the point P1. For example, when most of the secondary systems are away from the guard area of the primary system, when the primary reception station is present only in a narrow geographical area, or when the acceptable interference amount is remarkably strict at a certain point, a predetermined certain point may be used as a reference point for calculating the distances. When the acceptable interference amounts are defined to be different per modulation system, the reference point may be selected in consideration of not only the distance but also the modulation system or the acceptable interference amounts.

In a comparison between the first example and the second example, in the first example, the distance can be more easily calculated while a value of the path loss can be excessively underestimated. For example, when two secondary systems oppose each other with the primary system sandwiched therebetween, the above situation may occur. In this case, transmission power to be allocated to the secondary systems has a smaller value. Thus, the first example can be of lower calculation cost and safer definition in terms of interference prevention. On the other hand, in the second example, a value of the path loss is less likely to be excessively underestimated, and thus a chance of secondary usage can be further enhanced.

(6-3) Third Example

Figure 14C:
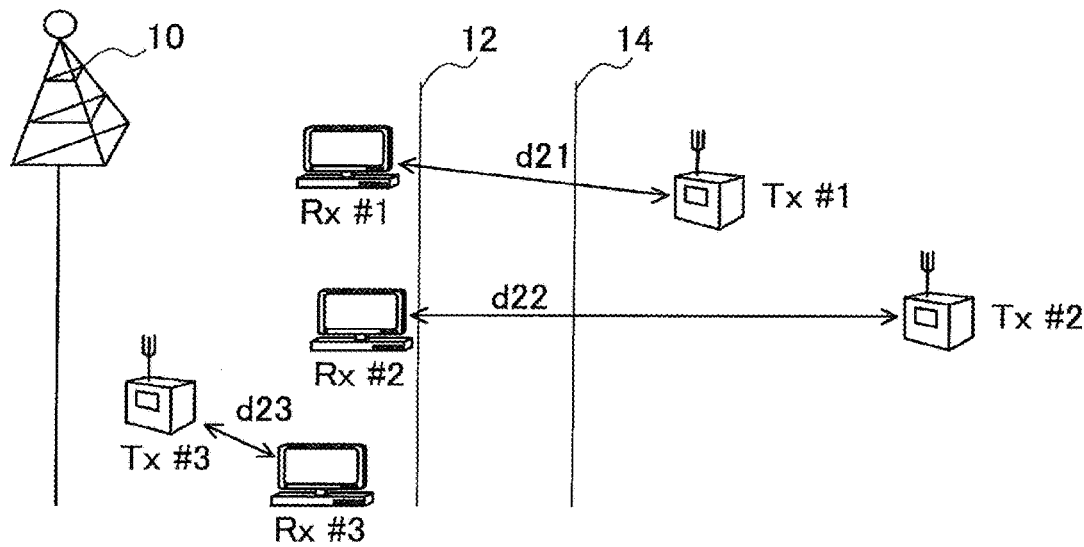
FIG. 14C is an explanatory diagram for explaining a third example of a definition of a distance between a primary system and each secondary system.

In the third example, the distance between the primary system and each secondary system is a distance between the position of each secondary system and the primary reception station closest thereto. For example, FIG. 14C illustrates three secondary systems and three primary reception stations. The first primary reception station is positioned to be closest to the first secondary system. The distance between the first secondary system and the first primary reception station is d21. The second primary reception station is positioned to be closest to the second secondary system. The distance between the second secondary system and the second primary reception station is d22. The third primary reception station is positioned to be closest to the third secondary system. The distance between the third secondary system and the third primary reception station is d23. Thus, d21, d22 and d23 can be used as the distance between the first secondary system and the primary system, the distance between the second secondary system and the primary system, and the distance between the third secondary system and the primary system, respectively.

(6-4) Fourth Example

Figure 14D:
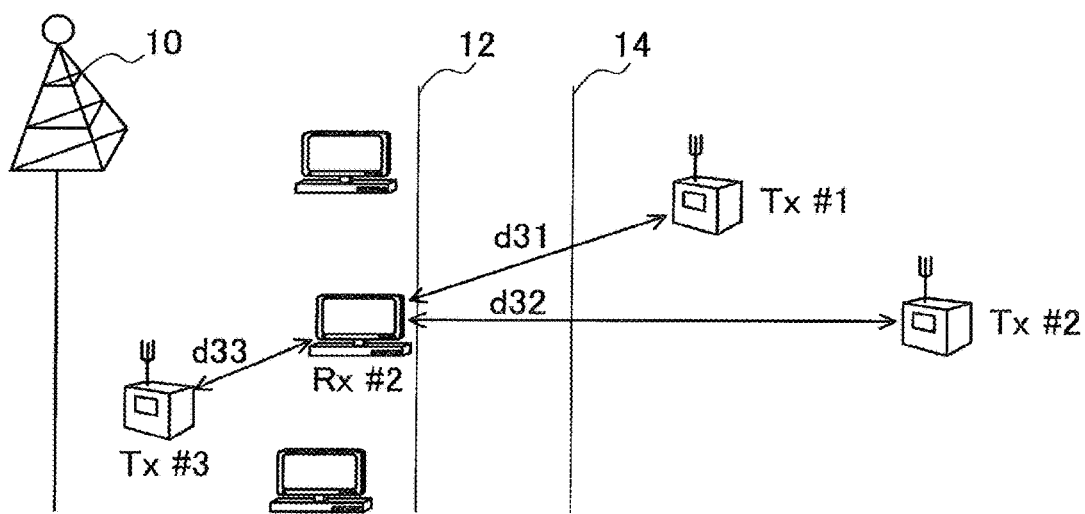
FIG. 14D is an explanatory diagram for explaining a fourth example of a definition of a distance between a primary system and each secondary system.

In the fourth example, the distance between the primary system and each secondary system is a distance to the primary reception station where a sum of the distances from the positions of all the secondary systems is minimum. For example, FIG. 14D illustrates three secondary systems and three primary reception stations again. The primary reception station where a sum of the distances from the positions of the three secondary systems is minimum is the second primary reception station. The distance between the first secondary system and the second primary reception station is d31. The distance between the second secondary system and the second primary reception station is d32. The distance between the third secondary system and the second primary reception station is d33. Thus, d31, d32 and d33 can be used as the distance between the first secondary system and the primary system, the distance between the second secondary system and the primary system, and the distance between the third secondary system and the primary system, respectively.

In the third and fourth examples, the actual position of the primary reception station is a reference point for calculating the distances, and thus the interference amount needs to be estimated in a more practical manner.

(6-5) Reference Point on Secondary System Side

In the examples of FIGS. 14A to 14D, there has been mainly described how the reference point on the primary system side is set for calculating the distances between the primary system and the secondary systems. To the contrary, various setting methods can be considered for the reference point on the secondary system side. For example, the position of the reference point on the secondary system side may be simply at the position of the master secondary communication node 200 of the secondary system. Instead, the position of the reference point on the secondary system side may be at the position of the node closest to the guard area of the primary system or any primary reception station among the nodes (the master node and the slave nodes) in the secondary systems. Though the calculation is complicated, a plurality of distances may be calculated with reference to the positions of the nodes in the secondary systems, and a collective path loss can be calculated depending on the distances. The method for setting a reference point on the secondary system side may be combined with the method for setting a reference point on the primary system side illustrated in FIGS. 14A to 14D.

For example, a reference point on the secondary system side may be set as follows in a stepwise manner. At first, a reference point on the secondary system side is tentatively set at the master secondary communication node 200 of the secondary system. Then, a point on the outer periphery of the service area of the primary system closest to the secondary communication node 200 or a point of the primary reception station closest thereto is set as a reference point on the primary system side. Then, interferences given to the reference point on the primary system side are estimated for each of the nodes (the master node and the slave nodes) of the secondary systems. A position of the node on the secondary system side causing a maximum interference to the reference point on the primary system side is set as a final reference point on the secondary system side. For estimating an interference per node in the secondary system, different transmission power may be considered depending on a type of the node (master node or slave node).

<4. Exemplary Structure of Communication Device (Secondary Communication Node)>

Figure 15:
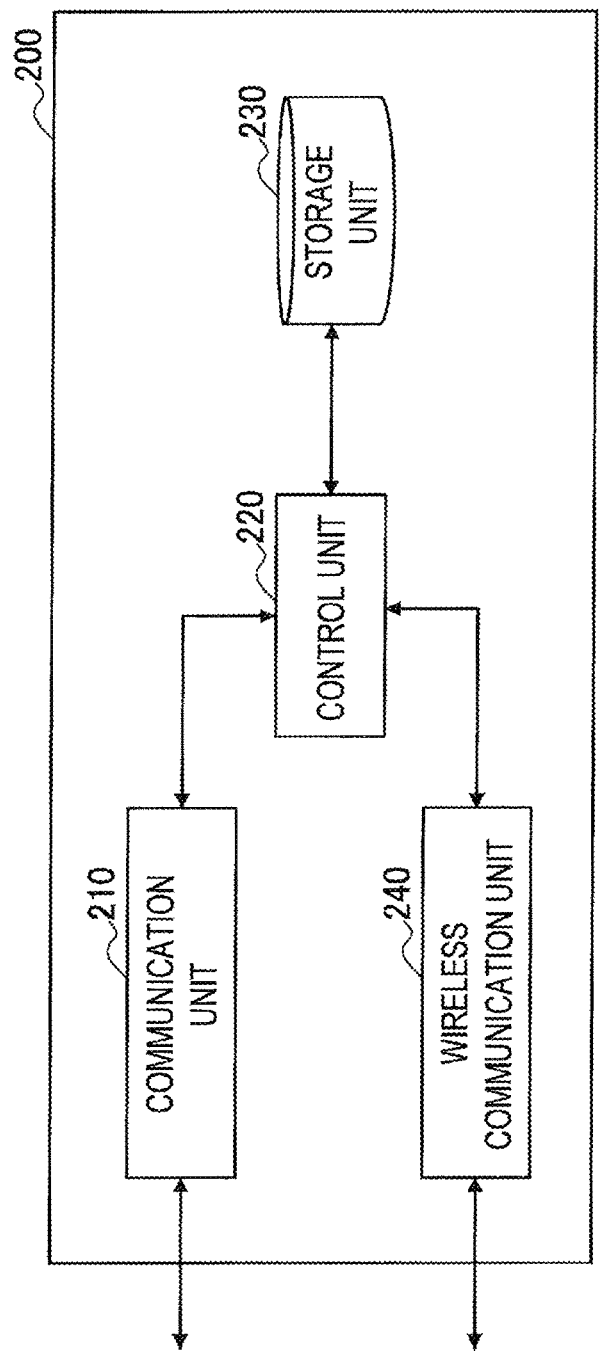
FIG. 15 is a block diagram illustrating an exemplary structure of a secondary communication node according to one embodiment.

FIG. 15 is a block diagram illustrating an exemplary structure of the secondary communication node 200 operating the secondary system by use of transmission power allocated by the communication control device 100. With reference to FIG. 15, the secondary communication node 200 comprises a communication unit 210, a control unit 220, a storage unit 230 and a wireless communication unit 240.

The communication unit 210 operates as a communication interface for communication between the secondary communication node 200, and the data server 30 and the communication control device 100. The communication unit 210 transmits the information on the secondary system to the data server 30 under control of the control unit 220 when starting secondary usage, for example. The communication unit 210 receives the information notified from the data server 30. The communication unit 210 exchanges interference control requests and responses with the communication control device 100. Thereafter, when transmission power allocation is determined by the communication control device 100, the communication unit 210 receives a transmission power allocation result (step S17 in FIG. 4).

The control unit 220 serves to control the entire operations of the secondary communication node 200. For example, the control unit 220 controls interferences to the primary system upon the operation of the secondary system in association with the communication control device 100 according to the sequence illustrated in FIG. 4. More specifically, when the transmission power allocation result by the communication control device 100 is received by the communication unit 210, the control unit 220 restricts the transmission power for communication between the wireless communication unit 240 and the other secondary communication node based on the transmission power allocation result.

The control unit 220 may further distribute the transmission power allocated to the secondary systems operated by its device between the secondary communication nodes participating in the secondary system. This means that the secondary communication node 200 can serve as a master for managing transmission power for a group of nodes participating in one secondary system. In this case, the master secondary communication node 200 controls transmission power of the slave nodes in order to prevent the communication between the slave nodes from giving fatal interferences to the primary system. Typically, an error occurs in the control of transmission power. However, for example, the safety margin SM is introduced, thereby preventing fatal interferences due to an error in the control of transmission power from occurring in the primary system. For example, the secondary communication node 200 may recognize a duty cycle of the slave node, and may dynamically set the safety margin depending on the recognized duty cycle. In this case, the secondary communication node 200 reports the dynamically-set safety margin to the communication control device 100 via the data server 30 or directly. Instead, the communication control device 100 may dynamically set the safety margin depending on the duty cycle reported from the secondary communication node 200.

The storage unit 230 stores therein programs and data to be used for association with the communication control device 100 and operation of the secondary system by use of a storage medium such as hard disk or semiconductor memory.

The wireless communication unit 240 operates as a wireless communication interface for wireless communication between the secondary communication node 200 and the other secondary communication node. The wireless communication unit 240 exchanges wireless signals with other secondary communication nodes participating in the secondary systems according to the IEEE802.22, IEEE802.11af or ECMA-392, for example. Transmission power of the wireless signals transmitted from the wireless communication unit 240 is restricted by the control unit 220 based on the transmission power allocation result by the communication control device 100.

<5. Adaptive Setting of Margin>

In the fixed margin system according to the embodiment, the fixedly-preset distribution margin MI is employed for distributing transmission power. A value of the distribution margin MI is an arbitrary value in the range of 3 dB to 6 dB, for example. A calculation for distributing transmission power is simplified by fixedly setting the value of the distribution margin MI, and thus the fixed margin system has an advantage of easy mounting. However, for example, when a fixed distribution margin of 6 dB is introduced, the number of operable secondary systems per channel is about 4 at maximum. The number of secondary systems is not necessarily enough to enhance a chance of secondary usage of the frequency. When a fixed margin having a larger value is set, there is a problem that when the number of secondary systems is smaller than the estimated number, individual transmission power is excessively restricted. Further, the number of secondary systems can be different per channel, and thus the value of the margin may be dynamically set more desirably than the fixed margin system. In the present section, a communication control device having a structure of dynamically setting a value of the margin will be described.

Figure 16:
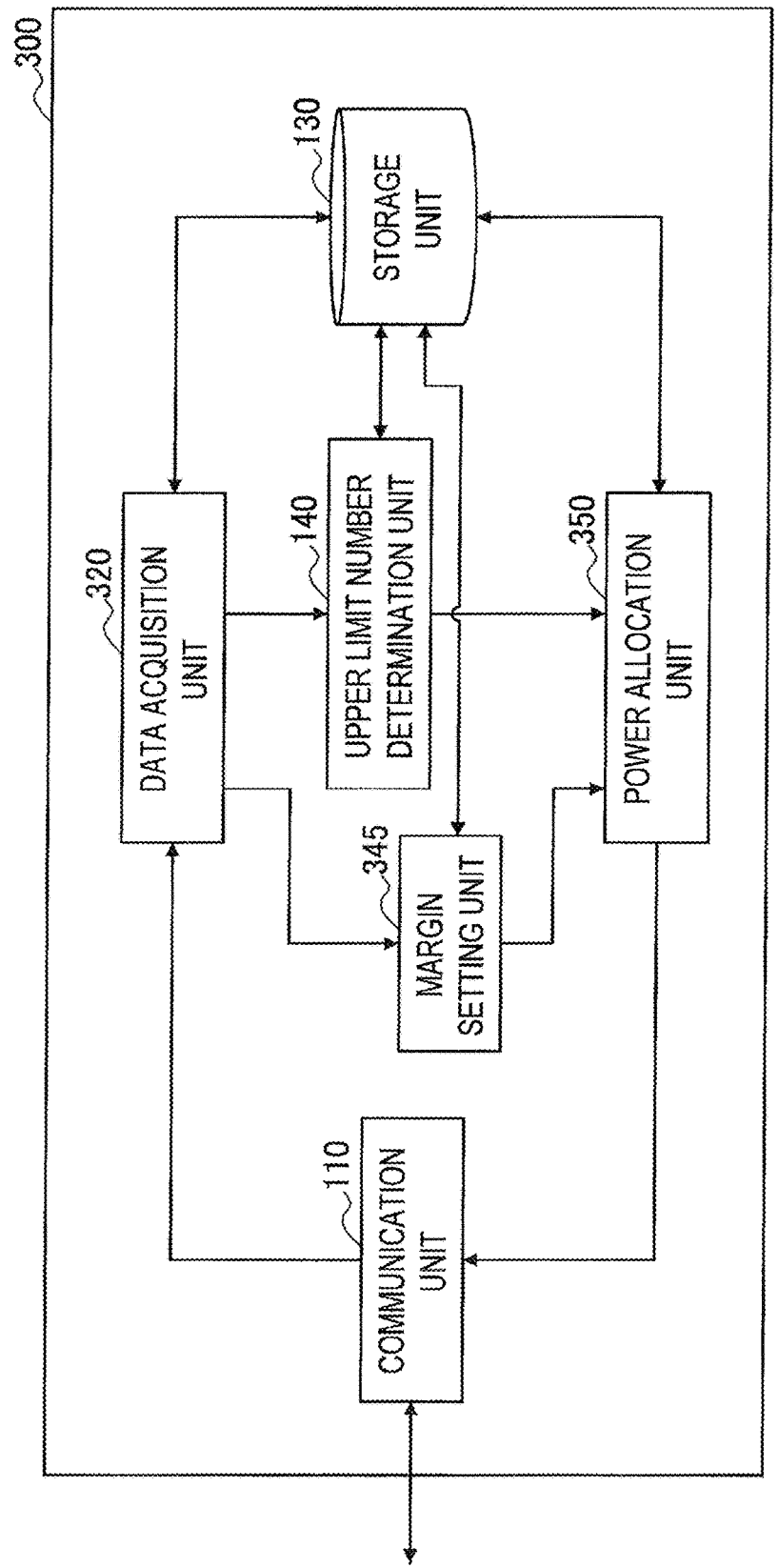
FIG. 16 is a block diagram illustrating an exemplary structure of a communication control device according to one variant.

FIG. 16 is a block diagram illustrating an exemplary structure of a communication control device 300 according to one variant of the embodiment. With reference to FIG. 16, the communication control device 300 comprises the communication unit 110, a data acquisition unit 320, the storage unit 130, the upper limit number determination unit 140, a margin setting unit 345, and a power allocation unit 350.

The data acquisition unit 320 acquires data to be used by the margin setting unit 345 for dynamically setting a margin in addition to data to be acquired by the data acquisition unit 120 of the communication control device 100 from the data server 30 and the secondary communication node 200. The data to be used for setting a margin can include the number of secondary systems or secondary communication nodes in operation (that is, currently registered), or the maximum number of operable (or registerable) secondary systems or nodes, for example, as described later. The data acquisition unit 320 stores the acquired data in the storage unit 130.

The margin setting unit 345 sets a margin for reducing an interference risk upon allocation of transmission power by use of the data acquired by the data acquisition unit 320. The margin may be set per frequency channel, for example. For example, when a distribution margin for the frequency channel $f_i$ is assumed as $MI_i$, the distribution margin $MI_i$ can be expressed as follows as a sum of an in-band interference component and an inter-band interference component.

[Math. 22]

$$MI_i = MI'_i + \sum_{jj=1}^{Oj} MI''_{jj} \qquad (24)$$

In formula (24), the first term in the right side is an in-band interference component and the second term is an inter-band interference component. Specifically, in the first example, the distribution margin $MI_i$ can be calculated as follows by use of the number $U_i$ of secondary systems or secondary communication nodes in operation secondarily using the frequency channel $f_1$.

[Math. 23]

$$MI_i = U_i \qquad (25)$$

$$MI_i = U_i \cdot \alpha_i \qquad (26)$$

When the number $U_i$ of secondary systems or secondary communication nodes in operation can be used also as a value of the margin, formula (25) is used. On the other hand, when $U_i$ is corrected, a correction coefficient $\alpha_i$ is introduced as in formula (26). The correction coefficient $\alpha_i$ may be equal to the safety margin SM in formula (5).

In the second example, the distribution margin $MI_i$ can be calculated as follows by use of the maximum number $X_i$ of secondary systems or secondary communication nodes capable of secondarily using the frequency channel $f_i$, for example.

[Math. 24]

$$MI_i = X_i \qquad (27)$$

$$MI_i = X_i \cdot \beta_i \qquad (28)$$

When the maximum number $X_i$ of secondary systems or secondary communication nodes can be used also as a value of the margin, formula (27) is used. On the other hand, when $X_i$ is corrected, a correction coefficient $\beta_i$ is introduced as in formula (28). The correction coefficient $\beta_i$ may be equal to the safety margin SM in formula (5). $X_i$ does not change over time, unlike $U_i$ in formulas (25) and (26). Thus, traffics for acquiring information can be further reduced in the second example than in the first example.

In the third example and fourth example, the value of the margin is common in a plurality of frequency channels. In the third example, the distribution margin $MI_i$ can be calculated as follows by use of the in-band maximum value of the number of secondary systems or secondary communication nodes $U_i$ in operation.

[Math. 25]

$$MI_i = \max\{U_i\} \qquad (29)$$

$$MI_i = \max\{U_i \cdot \alpha_i\} \qquad (30)$$

In the fourth example, the distribution margin $MI_i$ can be calculated as follows by use of the inter-band maximum value of the maximum number of secondary systems or the maximum number of secondary communication nodes $X_i$ per channel.

[Math. 26]

$$MI_i = \max\{X_i\} \qquad (31)$$

$$MI_i = \max\{X_i \cdot \alpha_i\} \qquad (32)$$

Figure 17:
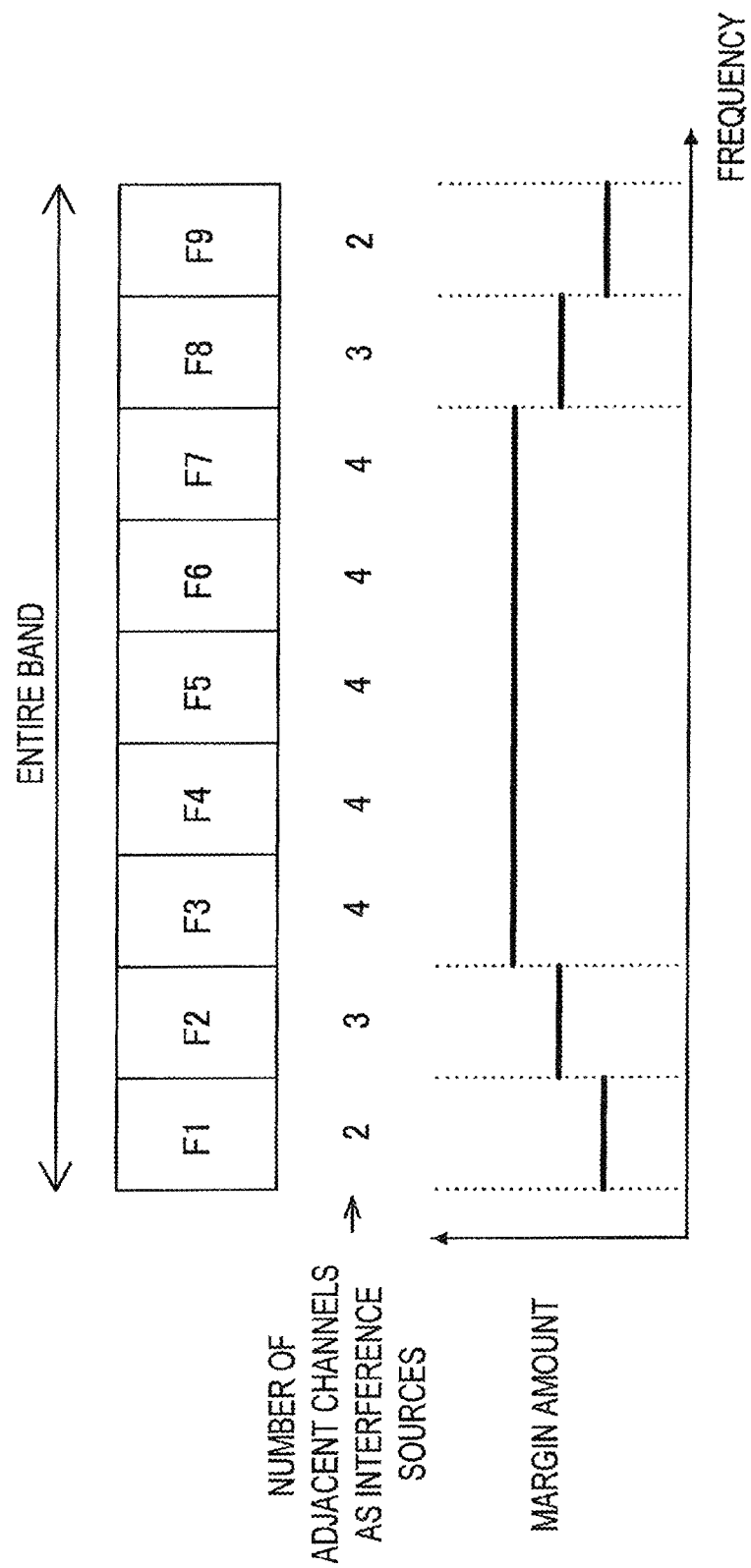
FIG. 17 is an explanatory diagram for explaining setting of margins depending on a frequency channel position in a band.

The margin setting unit 345 may set a margin per frequency channel such that the margin of the frequency channel at the center of the band is relatively larger than the margins of the frequency channels at the ends. In the example of FIG. 17, nine frequency channels F1 to F9 are present in the entire band. With the channel structure, the wireless signals from the adjacent channels and one more frequency channel may be the interference sources, for example. Thus, for example, four neighboring channels may be the interference sources for the frequency channels F3 to F7 at the center of the band, while two neighboring channels for the frequency channels F1 and F9 at the ends of the band and only three neighboring channels for the frequency channels F2 and F8 may be the interference sources. Thus, the margin setting unit 345 can efficiently enhance a chance of secondary usage particularly at the ends by setting the margins such that the margin of the frequency channel at the center of the band is set to be larger than the channels at the ends as illustrated in the lower graph of FIG. 17. The calculation of the margin depending on the position of the frequency channel may be realized by defining the correction coefficient $\alpha_i$ in formula (26) or the correction coefficient $\beta_i$ in formula (28) as in the graph of FIG. 17.

The margin setting unit 345 may employ a value corresponding to a transmission spectrum mask of the secondary system (or an adjacent channel leakage ratio (ACLR)) for setting a distribution margin per frequency channel. For example, when an out-band loss from the channel $F_{jj}$ to the channel $F_i$ is assumed as $H(i, jj, kk)$, a value corresponding to the transmission spectrum mask is used so that the distribution margin $MI_i$ can be updated as in the following formula:

[Math. 27]

$$MI'''_i = MI_i / H(i, jj, kk) \qquad (33)$$

The power allocation unit 350 allocates transmission power to each secondary system or each secondary communication node in each secondary system based on the upper limit number determined by the upper limit number determination unit 140 and the acceptable interference amount of the primary system like the power allocation unit 150 in the communication control device 100. At this time, the power allocation unit 350 uses a value adaptively set by the margin setting unit 345 as a value of the distribution margin MI.

With the structure according to the variant, the value of the margin is adaptively set, thereby more efficiently enhancing a chance of secondary usage without causing a fatal interference to the primary system. The calculation formulas of MI or MI''' in formula (25) to formula (33) may be used for calculating MI' in the first term or MI" in the second term in the right side of formula (24).

<6. Conclusion>

One embodiment has been described above with reference to FIG. 1 to FIG. 17. According to the present embodiment, the upper limit number of secondary systems or secondary communication nodes to be allocated with transmission power is determined by the communication control device making communication with the secondary communication nodes operating the secondary system, and transmission power to be secondarily used is allocated based on the upper limit number and the acceptable interference amount of the primary system. Thereby, when a plurality of secondary systems are present, a fatal interference can be prevented from occurring in the primary system while a chance of secondary usage is given to the secondary systems within the upper limit number. A usage efficiency of the frequency resources can be enhanced appropriately and safely.

According to the present embodiment, the upper limit number of transmission power allocation targets is determined by evaluating a difference between the interference amount of the primary system estimated from the communication quality requirement of each secondary system and the acceptable interference amount of the primary system. Thereby, the required communication quality is secured and the communication purpose can be achieved for the secondary systems to which a chance of secondary usage is given.

According to the present embodiment, when not only a frequency channel allocated to the primary system but also a neighboring frequency channel is secondarily used, transmission power is allocated such that a sum of the interference amounts caused by the secondary usage of the frequency channels does not exceed the acceptable interference amount of the primary system. Thereby, an inter-band interference caused by an out-band radiation can be prevented from causing a fatal interference to the primary system.

According to the present embodiment, transmission power is tentatively distributed to the secondary systems using the frequency channel per frequency channel, and then redistributed between the secondary systems using different frequency channels. With the stepwise transmission power distribution, the transmission power to be allocated can be calculated with less calculation resources. Consequently, loads for transmission power allocation can be reduced when the number of frequency channels or the number of secondary systems to be considered increases.

The processing in each device described in the present specification may be realized by any of software, hardware, or a combination of software and hardware. The programs configuring the software are previously stored in a storage medium provided inside or outside each device, for example. Each program is read in a RAM (Random Access Memory) during execution, and is executed by a processor such as CPU (Central Processing Unit).

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST 100,300 Communication control device
110 Communication unit
140 (Upper limit number) determination unit
345 Margin setting unit
150,350 Power allocation unit
200 Communication device (secondary communication node)
210 Communication unit
220 Control unit

The invention claimed is:

1. A communication control device comprising:
a circuitry configured to:
make communication with one or more secondary communication nodes operating a secondary system using at least one of a frequency channel allocated to a primary system or a frequency channel adjacent to the frequency channel;
determine a first upper limit number of frequency channels allocated to the primary system;
allocate transmission power to each secondary system or each secondary communication node in each secondary system based on the determined first upper limit number per frequency channel used by the secondary system; and
restrict transmission power based on a power allocation result.

2. The communication control device according to claim 1, wherein the circuitry is configured to determine the first upper limit number based on a communication quality requirement of each secondary system.

3. The communication control device according to claim 1, wherein when a plurality of frequency channels are used by one or more secondary systems, the circuitry is configured to allocate transmission power to each secondary system or each secondary communication node in each secondary system such that a sum of interference amounts to the primary system caused by secondary usage of the frequency channels does not exceed an acceptable interference amount of the primary system.

4. The communication control device according to claim 3, wherein the circuitry is configured to determine a second upper limit number of other frequency channels, and to use the first upper limit number and the second upper limit number to allocate transmission power to each secondary system or each secondary communication node in each secondary system.

5. The communication control device according to claim 4, wherein the circuitry is configured to tentatively distribute transmission power to secondary systems using a frequency channel per frequency channel used by the secondary system, and then to redistribute transmission power in secondary systems using a different frequency channel based on the tentatively-distributed transmission power.

6. The communication control device according to claim 1, wherein when a new secondary system starts to operate, the circuitry is configured to request a secondary system having excess transmission power among existing secondary systems to reduce transmission power.

7. The communication control device according to claim 1, wherein the circuitry is configured to determine transmission power allocation based on an acceptable interference amount of the primary system, and a path loss depending on a distance between the primary system and each secondary system, and the distance between the primary system and each secondary system is a minimum distance between the position of each secondary system and an outer periphery of a service area of the primary system or a node of the primary system.

8. The communication control device according to claim 1, wherein the circuitry is configured to determine transmission power allocation based on an acceptable interference amount of the primary system, and a path loss depending on a distance between the primary system and each secondary system, wherein the distance between the primary system and each secondary system is a distance between the position of each secondary system and a certain point on an outer periphery of a service area of the primary system or within the outer periphery.

9. The communication control device according to claim 1, wherein the circuitry is configured to ignore a secondary system for which a distance from the primary system or a path loss depending on the distance exceeds a predetermined threshold when calculating transmission power allocation.

10. The communication control device according to claim 9, wherein the threshold is set per frequency channel.

11. The communication control device according to claim 1, wherein the circuitry is configured to notify a power allocation result to a secondary communication node in response to a request from the secondary communication node received by the circuitry.

12. The communication control device according to claim 1, wherein the circuitry is configured to notify a power allocation result to a secondary communication node without depending on a request from the secondary communication node.

13. The communication control device according to claim 1, wherein the circuitry is configured to employ a margin for reducing an interference risk upon transmission power allocation, and the circuitry is further configured to set the margin based on the number of secondary systems or secondary communication nodes in operation or the maximum number of operable secondary systems or secondary communication nodes per frequency channel.

14. The communication control device according to claim 13, wherein the circuitry sets a margin per frequency channel such that the margin of a frequency channel at the center of a band is relatively larger than the margins of frequency channels at the ends.

15. A communication control method using a communication control device for making communication with one or more secondary communication nodes operating a secondary system by use of at least one of a frequency channel allocated to a primary system or a frequency channel adjacent to the frequency channel, comprising:
- determining a first upper limit number of frequency channels allocated to the primary system;
- allocating transmission power to each secondary system or each secondary communication node in each secondary system based on the determined first upper limit number per frequency channel used by the secondary system; and
- restricting transmission power based on transmission power allocation.

16. The communication control method according to claim 15, wherein determining the first upper limit number comprises determining the first upper limit number based on a communication quality requirement of each secondary system.

17. The communication control method according to claim 15, wherein allocating transmission power comprises, when a plurality of frequency channels are used by one or more secondary systems, allocating transmission power to each secondary system or each secondary communication node in each secondary system such that a sum of interference amounts to the primary system caused by secondary usage of the frequency channels does not exceed an acceptable interference amount of the primary system.

18. The communication control method according to claim 17, further comprising determining a second upper limit number of other frequency channels, and using the first upper limit number and the second upper limit number to allocate transmission power to each secondary system or each secondary communication node in each secondary system.

19. The communication control method according to claim 18, further comprising tentatively distributing transmission power to secondary systems using a frequency channel per frequency channel used by the secondary system, and then redistributing transmission power in secondary systems using a different frequency channel based on the tentatively-distributed transmission power.

20. A communication device operating a secondary system by use of at least one of a frequency channel allocated to a primary system or a frequency channel adjacent to the frequency channel, comprising:
- a circuitry configured to:
  - receive a transmission power allocation result from a communication control device configured to allocate transmission power to each secondary system or each secondary communication node in each secondary system based on an upper limit number of secondary systems or secondary communication nodes to be allocated with transmission power; and
  - restrict transmission power based on the transmission power allocation result.

* * * * *